US008612473B2

(12) United States Patent (10) Patent No.: US 8,612,473 B2
Theimer et al. (45) Date of Patent: Dec. 17, 2013

(54) METHOD AND DEVICE FOR ORGANIZING USER PROVIDED INFORMATION WITH META-INFORMATION

(75) Inventors: Wolfgang Theimer, Bochum (DE); Knut Haberland-Schlösser, Bochum (DE); Peter Weingart, Bochum (DE); Reza Serafat, Bochum (DE); Matthias Lück, Dortmund (DE); Udo Görtz, Bochum (DE); Klaus Rateitschek, Bochum (DE); Jakke Mäkelä, Turku (FI); Andreas Myka, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/874,814

(22) Filed: Sep. 2, 2010

(65) Prior Publication Data

US 2011/0060754 A1 Mar. 10, 2011

Related U.S. Application Data

(63) Continuation of application No. 10/540,440, filed as application No. PCT/IB02/05563 on Dec. 20, 2002, now Pat. No. 7,797,331.

(51) Int. Cl.
*G06F 17/30* (2006.01)
(52) U.S. Cl.
USPC .......................................... 707/769; 707/805
(58) Field of Classification Search
USPC ................................................ 707/769, 805
See application file for complete search history.

(56) References Cited

U.S. PATENT DOCUMENTS

| 4,882,765 A | 11/1989 | Maxwell et al. |
| 5,537,467 A | 7/1996 | Cheng et al. |

(Continued)

FOREIGN PATENT DOCUMENTS

| EP | 0 822 728 A2 | 2/1998 |
| EP | 1087306 A2 | 3/2001 |

(Continued)

OTHER PUBLICATIONS

Derwent Publications Ltd., Week 199849, AN 1998-581046.

(Continued)

*Primary Examiner* — Son T Hoang
(74) *Attorney, Agent, or Firm* — Alston & Bird LLP

(57) ABSTRACT

The present invention is directed to a method for organizing user provided information in a mobile terminal device with meta-information to allow retrieval of the user provided information, and a device configured to perform the method. The user provided information is obtained by any user operation against the mobile terminal device and context information is obtained associated with the User provided information. The meta-information is obtained from the context information and assigned to the user provided information. The meta-information is employed for retrieval of the User provided information by matching request information with the meta-information. Further, the method for organizing user provided information employs calendar information for obtaining meta-information. Further, the method for organizing user provided information is adapted to organize user provided audio information. Further, the method for organizing user provided information is adapted to organize User provided audio information by embedding meta-information into the User provided audio information.

19 Claims, 12 Drawing Sheets

(56) References Cited

U.S. PATENT DOCUMENTS

| | | |
|---|---|---|
| 5,805,773 A | 9/1998 | Kometani et al. |
| 6,075,755 A | 6/2000 | Zarchan |
| 6,192,056 B1 | 2/2001 | Tsuruoka |
| 6,212,199 B1 | 4/2001 | Oxford |
| 6,236,768 B1 | 5/2001 | Rhodes et al. |
| 6,484,156 B1 | 11/2002 | Gupta et al. |
| 6,741,996 B1* | 5/2004 | Brechner et al. ............ 1/1 |
| 7,624,143 B2 | 11/2009 | Newman et al. |
| 2001/0049691 A1 | 12/2001 | Asazu |
| 2002/0031240 A1 | 3/2002 | Levy et al. |
| 2002/0188602 A1* | 12/2002 | Stubler et al. ............ 707/3 |
| 2002/0194246 A1* | 12/2002 | Moskowitz et al. ......... 709/102 |
| 2003/0009469 A1* | 1/2003 | Platt et al. ............ 707/100 |
| 2003/0033296 A1* | 2/2003 | Rothmuller et al. ........... 707/3 |
| 2003/0060979 A1 | 3/2003 | Andrews et al. |
| 2003/0133423 A1 | 7/2003 | LaDue |
| 2003/0148773 A1 | 8/2003 | Spriestersbach et al. |
| 2003/0156138 A1* | 8/2003 | Vronay et al. ............ 345/772 |
| 2003/0187820 A1* | 10/2003 | Kohut et al. ............ 707/1 |
| 2003/0187984 A1* | 10/2003 | Banavar et al. ............ 709/225 |
| 2004/0034655 A1 | 2/2004 | Tecu et al. |
| 2004/0177096 A1* | 9/2004 | Eyal et al. .................. 707/104.1 |
| 2004/0201740 A1* | 10/2004 | Nakamura et al. ......... 348/231.3 |

FOREIGN PATENT DOCUMENTS

| | | |
|---|---|---|
| EP | 1574093 | 9/2005 |
| EP | 1696355 A1 | 8/2006 |
| WO | WO 97/31473 | 8/1997 |
| WO | WO 99/27733 | 6/1999 |
| WO | WO 00/05914 | 2/2000 |
| WO | WO-2004/057892 A1 | 7/2004 |

OTHER PUBLICATIONS

"Reuse of Existing Subscription Specification Mechanism for Access to Historical Data", Research Disclosure 41487, INT. Business Machines Corp., Oct. 1998, p. 41487.

Wiesman, F. et al., *Graphical Information Retrieval by Browsing Meta-information* [online][retrieved May 3, 2013] Retrieved from the Internet from: <URL http://www.sciencedirect.com/science/article/pii/S0169260797000199 > pp. 135-152.

* cited by examiner

| # | user operation | terminal operation | |
|---|---|---|---|
| 1 | pushing "start" key | storing:<br>initiating: | TIME1, IMEI, location, other data;<br>recording audio data to storage device (AUDIO1) |
| 2 | dictating audio information | recording: | audio data to storage device (AUDIO1) |
| 3 | pushing and holding "keyword" key | initiating:<br>storing:<br>continuing: | recording audio data to memory (KEYWORD_AUDIO1);<br>TIME2;<br>recording audio data to storage device (AUDIO1) |
| 4 | dictating keywords | recording:<br>continuing: | audio data to memory (KEYWORD_AUDIO1)<br>recording audio data to storage device (AUDIO1) |
| 5 | releasing "keyword" key | stopping:<br>continuing: | recording audio data to memory (KEYWORD_AUDIO1);<br>recording audio data to storage device (AUDIO1) |
| 6 | dictating audio information | continuing: | recording audio data to storage device (AUDIO1) |
| 7 | pushing "pause" key | pausing:<br>storing: | recording audio data to storage device (AUDIO1);<br>TIME3 |
| 8 | taking image &<br>pushing "attach" key | attaching:<br>storing: | image to audio data (AUDIO1)<br>picture to memory (IMAGE1) |
| 9 | pushing "continue" key | storing:<br>resuming: | TIME4;<br>recording audio data to storage device (AUDIO1) |
| 10 | dictating audio information | continuing: | recording audio data to storage device (AUDIO1) |
| 11 | pushing "stop" key | stopping:<br>storing:<br>storing<br>generating: | recording audio data to storage device (AUDIO1);<br>TIME5<br>to storage device: IMAGE1, KEYWORD_AUDIO1;<br>description information (DICTATION1) |

Fig. 4b

```
 1:  <ID: Storage ID>
 2:  <ID: device ID>
 3:  <ID: start time>
 4:
 5:  <BEGIN>
 6:     Start time: TIME1
 7:     Stop  time: TIME5
 7:
 8:     Link to AUDIO1
10:
11:     <#keywords>
12:        TIME2
13:        Link to KEYWORDS_AUDIO1
14:
15:                    M
```

```
16:     <#pauses>
17:        TIME3
18:        TIME4
19:
20:     <#embedded objects>
21:        TIME3
22:        Link to IMAGE1
23:
24:     <#location information>
25:        location related data
26:
27:     <#other information>
28:        sensor related data
29:
30:  <END>
```

Fig. 4c

| Clip | Date / Time | Place | Thumbprint | Keywords | Images |
|---|---|---|---|---|---|
| #001 | 20.02.2002 7:02 | Turku / Car | - | *Link keywd #1* *Link keywd #2* *Link keywd #2* | - |
| #002 | 20.02.2002 12:51 | Salo / Office | *Link text #1* | *Link keywd #4* *Link keywd #5* *Link keywd #6* | *Link img #1* *Link img #2* |
| M | M | M | M | M | M |

METHOD AND DEVICE FOR ORGANIZING USER PROVIDED INFORMATION WITH META-INFORMATION

CROSS-REFERENCE TO RELATED APPLICATIONS

This application is a continuation of U.S. patent application Ser. No. 10/540,440, filed on Apr. 19, 2006, now U.S. Pat. No. 7,797,331 which is a national phase entry of International Patent Application Number PCT/IB2002/005563, filed on Dec. 20, 2002. The contents of both U.S. patent application Ser. No. 10/540,440 and International Patent Application Number PCT/IB2002/005563 are incorporated herein by reference.

BACKGROUND OF THE INVENTION

The present invention relates to a method and a device for organizing user provided information with meta-information. In particular, the user provided information is user provided audio information. The meta-information is received from context information being available in conjunction with the user provided information and related logically thereto. The present invention is especially useful in the field of mobile terminal devices and mobile network devices which are more and more subjected for handling huge amounts data of different types and kinds which are related to some extent.

The spread of mobile electronic devices within the population of industrial states is increasing in a more and more rapid way and in parallel the acceptance for usage of those mobile electronic devices increases dramatically due to the advantages which are provided by those mobile electronic devices in comparison to classical paper-based utilities. The capability of mobile electronic devices for collecting, acquiring, recording, storing, providing and processing electronic information grows in consequence to the increasing processing and storing capability such that the mobile electronic devices will gain more and more ability to be employed as universal information handling systems including the "traditional" forms of usage such as electronic calendar, electronic personal address book and electronic personal telephone directory and future forms of usage comprising digitized (electronic) information of any kind and/or of any format.

Today, the acquiring of electronic information and digitized available multimedia data is primarily based on retrieving electronic information from information providing and serving systems, respectively. In the future, the increasing capabilities of mobile electronic devices will result in abilities to produce "own" electronic information and digital multimedia data, respectively, for example by the possibility to digitize legacy documents and to store the digitized version, by components of the mobile electronic devices allowing to acquire electronic information like pictures/images, movies, digital audio information and to store those data in electronic (digital) form.

As known from today's electronic information systems an increasing potential for accessing and retrieving information involves the problem of informational overload which can be experienced in conventional office environment involving the usage of e-mail, electronic journals, faxes, memos, messaging services, web-based information services etc delivering a huge amount of simultaneous information. The aforementioned increasing capability to acquire additionally electronic based information will intensify the problem of the informational overload.

The possibility to access, manage, retrieve etc electronic information migrates to an increasing extent from classical desktop systems (e.g. personal computers) to mobile electronic devices like electronic organizers, personal digital assistants (PDA), mobile communication enabled terminals and the like such that the collecting of personal multimedia information relating to a user and events in the user's life become a predominant feature. The personal multimedia information may be understood to comprise information acquired by audio recording, voice recording, taking pictures, taking videos, retrieving electronic information from any information serving service (document/information server), receiving electronic information via any transmitting service, transmitting bearer, etc.

Consequently, the possibility and opportunity to collect huge amount of data is only valuable provided the collected information is employable in an effective, meaningful, reliable and user-friendly way especially meeting the demands of a user in a cost-efficient way. The retrieval of certain information is primarily based and dependent on a reliable and efficient organization of the stored information being provided with indexing and/or labeling information which is used for identifying associated information. An effective, meaningful, reliable and user-friendly retrieval will be the only way to cope with the informational overload since the huge amount of available information will otherwise result in a confusing collection of pointless information.

BRIEF SUMMARY OF THE INVENTION

An object of the present invention addresses a method for managing user provided information with meta-information. The meta-information is extracted from information provided and available in the context of the user provided information. The meta-information is employed for retrieval of user provided information. The management enables to organize user provided information for establishing a retrieval system employing the associated meta-information.

A further object of the present invention is to provide a method for managing user provided audio information with meta-information, wherein the user provided audio information represents a subset of the user provided information. The meta-information is provided simultaneously to the user provided audio information.

The objects of the invention are achieved with a method for organizing user provided information, a corresponding device adapted to perform the method, computer programs and software tools which are disclosed in the independent claims. Preferred embodiments of the invention are disclosed in the dependent claims.

According to a first aspect of the invention, a method for organizing user provided information with meta-information is provided. The organized user provided information in conjunction with the meta-information allows to set up an information history functionality which allows to retrieve purposefully user provided information which is stored therein. The user provided information is available in a mobile terminal device and is obtained for being processed. The user provided information is to be understood as data which has been generated, received, or which occurs in consequence to any user operation being performed against the mobile terminal device. The user provided information may be generated by employing user input means or may be received or obtained via any data communication interface provided by the mobile terminal device. It shall be further understood, that the user input means may be an arrangement of keys, a keyboard, a keypad or any other manually operable inputting component (joystick, pen etc), but also enhanced input means such as an audio sensor. (microphone), a digital camera capable to take photos and/or image sequences (videos) and further sensor input. The data communication interface may be any interface able to receive, transmit or communicate electronic data of any type with a counterpart device, in particular transaction information and/or communication information are comprised. Additionally, context information is obtained in parallel. The context information is associated with the user provided information. It shall be understood, that context information e.g. includes information about a device application and/or device function currently active and to which the user provided information is originally related, position/location information, time information and any further information being available in parallel to the user provided information and being related (chronologically and/or logically) to the user provided information.

The user provided information and the associated context information is combined in accordance with logical and/or chronological relationship. The combining of the user provided information and the associated context information is performed by obtaining individual information from the context information to be used as meta-information. The user provided information as well as the meta-information employed is stored in a history storage.

The meta-information serves to enable previous retrieval of the user provided information in a purposeful manner In case of retrieval, a retrieval request includes request information. The request information is compared with the meta-information and in case of a matching the associated user provided information is retrieved correspondingly from the history storage. The context information represents an information pool of individual information which are usable as meta-information for the user provided information. In particular, this kind of providing meta-information may be employed in case the user provided information itself, e.g. multimedia information like video sequences, audio sequences, images etc., includes information of such a type which evade retrieving due to the fact that suitable retrieving information is difficult to be defined.

According to an embodiment of the invention, the meta-information is extracted from the associated context information and the extracted meta-information is assigned to the user provided information to be stored in the history storage. The meta-information comprises individual information parts being included in the context information, wherein the individual information parts are extracted in accordance with pre-defined and/or user-defined regulation(s) which may vary depending on the kind of user provided information and depending of the composition of the context information.

According to an embodiment of the invention, the user provided information is received from an input means of the mobile terminal device as user input information. Further the user provided information is received from any data communication interface of the mobile terminal device as communication information and/or transaction information.

According to an embodiment of the invention, labeling information and/or indexing information is extracted from the context information. The labeling information and/or indexing information is assigned to the user provided information and stored in combination therewith in order to enable a retrieval of the stored user provided information by the means of the assigned labeling information and/or indexing information used for specifying the content of the stored user provided information.

Analogously, the labeling information and/or the indexing information is employed for being compared with request information in order to enable a purposeful retrieving, filtering and/or sorting of user provided information provided by the user history functionality.

According to an embodiment of the invention, referencing information or addressing information is generated, respectively. The referencing information is generated for at least a part of the user provided information. The referencing information is stored in a first storage area, preferably, in conjunction with the meta-information which allow the retrieval, whereas the part of the user provided information being referred by the referencing information is stored in a second storage area. The referencing information specifies the storage place of that part of the user provided information and enable a retrieval thereof from the second storage area.

According to a second aspect of the invention, a method for organizing user provided information with meta-information is provided. The meta-information allows for retrieving the user provided information which is available in a mobile terminal device. The context information obtained in conjunction with the user provided information comprises calendar information which are provided by an electronic calendar functionality (i.e. an electronic calendar application) implemented in the mobile terminal device. The calendar information and the user provided information is matched in order to obtain meta-information from the calendar information, wherein matching calendar information is assigned to the user provided information to be stored in the history storage.

According to an embodiment of the invention, a first time information is obtained in accordance with the user provided information, i.e. a moment in time, a period of time or the like being related to the user provided information, e.g. moment in time at which user provided information has been inputted/received.

Further calendar information includes a plurality of calendar entries each of which is associated with a second time information which relates analogously to a moment in time or a period of time. The first time information and each of the second time information is compared and in case the first time information and one of the second time information matches, at least a part of the information comprised in the matching calendar entry is extracted for being employed as meta-information.

Particularly, the user provided information shall be understood to be any multimedia information operable with the mobile terminal device. That is, for example a video sequence taken by a digital camera plugged onto and implemented in the mobile terminal device or an audio sequence recorded by a digital dictation apparatus also being plugged onto and implemented in the mobile terminal device and the like.

According to an embodiment of the invention, a membership function (cf. Fuzzy Set theory) is assigned to the second time information and a membership grade is obtained from this membership function in accordance with the first time information. The membership grade is employed to define a measure which allows to estimate a reliability for retrieval.

According to an embodiment of the invention, the first time information defines a first period of time. The user provided information is partitioned into a plurality of information parts. Each information part has a maximal pre-defined period of time. Each information is processed separately in accordance with any of aforementioned methods according to an embodiment of the invention.

According to an embodiment of the invention, the first time information defines a first period of time and the second time information defines a second period of time. In case the first period of time exceeds the second period of time in length, i.e. the first period of time overlaps the second period of time, the user provided information is sectioned into at least two information sections such that one information section of the user provided information sections relates to a period of time which is a sub-period of the first period of time and fits into the second period of time. The one information section which fits into the second period of time is processed in accordance with any of aforementioned methods according to an embodiment of the invention.

According to an embodiment of the invention, the second period of time has certain pre-defined overhead periods of time extending the second period to previous times and to subsequent times.

According to an embodiment of the invention, the calendar information and particularly each calendar entry being comprised in the calendar information is semantically structured, respectively, i.e. the information comprised in each calendar entry is organized into several fields each relating to a certain information context like: "who", "where", "when", "what", etc., which allows to obtain reliable meta-information from the calendar entries.

According to a third aspect of the invention, a method for organizing user provided audio information with meta-information is provided. The user provided audio information is associated with additional user provided information obtained during the recording of the user provided audio information and completed with context information related to the recording of the provided audio information. The user provided audio information is inputted in a mobile terminal device by dictating of the user. The user provided audio information is received, recorded and stored in the mobile terminal device. During the receiving, recording and storing of the user provided audio information the context information is received. The context information comprises at least user input information operable by the user to control the recording process. The context information is logged and meta-information is generated which is based on the recording context information.

The recording context information is to be employed for retrieval of the stored user provided audio information by matching request information provided with a retrieval request with the recording context information for selecting the stored user provided audio information. The recording context information offers additionally information relating to the additional user provided information which relates to the user provided audio information.

According to an embodiment of the invention, the user input information which is received during the recording of the user provided audio information comprises control signals relating to the operating of the audio recording. On receiving a start signal the recording and storing of the user provided audio information is initiated. On receiving a keyword signal the receiving, recording and storing of a user provided audio keyword information is initiated. The one or more keywords comprised by the user provided audio keyword information relate to the user provided audio information being recorded and stored and allow to retrieve the stored user provided audio information. On receiving an attach signal additional information, in particular multimedia information received or provided by the mobile terminal device, is associated with the user provided audio information. On receiving a pause signal the recording and storing of the user provided audio information is paused. On receiving a continue signal the previously paused recording and storing of the user provided audio information is resumed. And on receiving a stop signal the recording and storing of the user provided audio information is stopped and the recording context information is generated.

According to an embodiment of the invention, the recording of context information includes at least information about the recorded user provided audio information comprising information about the user provided keyword audio information, time information about the user provided audio information, the user provided keyword audio information, the user input information being received during recording and information about the additional information which is associated with the user provided audio information being recorded.

According to an embodiment of the invention, the generating of the recording context information comprises an encoding of the recording context information being the meta-information as a document being based on a markup language such as the extended markup language (XML).

According to an embodiment of the invention, the meta-information relating to the recording context information is displayed. The displaying is enabled by assigning graphical elements to the information which is included in the recording context information. A dedicated graphical element is assigned to each kind of information entry included in the recording context information. The dedicated graphical elements are displayed to illustrate the content of the recording context information and the inter-dependencies thereof in a graphical depiction allowing a user to have a clear overview of the recording context information.

According to a fourth aspect of the invention, a method for organizing user provided audio information by embedding meta-information into the user provided audio information is provided. The user provided audio information is supplied to a mobile terminal device. A set of code bases is defined. The set of code bases represents a plurality of coding symbols. Each code basis of the set of code bases defines at least one predefined frequency. The meta-information is mapped into said coding symbols provided and the mapped meta-information is included directly into the user provided audio information resulting in a combined user provided audio information having embedded the meta-information.

According to an embodiment of the invention, a modulation signal is obtained from the mapped meta-information and a modulated signal is obtained by combining the user provided audio information and the modulation signal in the frequency domain. Further, the modulated signal is combined with the user provided audio information in the time domain of the signals resulting in a user provided audio information which has embedded the meta-information coded in the coding symbols provided by the set of code bases.

According to an embodiment of the invention, the set of code bases is defined in a certain frequency sub-range being part of a total frequency range. The at least one frequency being pre-defined in each one of the code bases is mapped to the further frequency sub-ranges within the total applicable frequency range. For example, the certain frequency sub-range may be an octave within which the code bases are defined. The frequency definitions of the code bases are mapped correspondingly onto further octaves being within the total applicable frequency range. The total frequency range may be defined by the audio processing capability of the mobile terminal device and by the applicability in reference to the user provided audio information, respectively.

According to an embodiment of the invention, the modulated signal is obtained by multiplying the user provided audio information and the modulation signal in the frequency domain of the signals. According to an embodiment of the invention, the user provided audio information which has embedded the meta-information is obtained by adding the modulation signal and the user provided audio information in the time domain of the signals.

According to a fifth aspect of the invention, a method for extracting meta-information from a user provided audio information which has embedded the meta-information is provided. Therefore, a correlation basis is provided. The correlation basis comprises all frequencies which are defined in the code bases which have been employed for embedding the meta-information into the audio information. The correlation basis is applied onto the user provided audio information having embedded the meta-information to extract the meta-information.

According to an embodiment of the invention, a modulation signal is obtained in accordance with the correlation basis and the modulation signal which is applied. onto the user provided audio information having embedded the meta-information in the frequency domain of the signals by convoluting the modulation signal and the user provided audio information having embedded the meta-information and the correlation signal resulting in a correlation signal. Magnitude values are extracted from the correlation signal. Each magnitude value corresponds to one code basis of the set of code bases. The magnitude values are evaluated in order to reconstruct meta-information being embedded in the audio information.

According to an embodiment of the invention, the evaluation further comprises obtaining of ratio values. A ratio value is calculated from each pair of magnitude values. The ratio values are normalized, for example by normalizing with respect to an average ratio value. The evaluation of the normalized ratio values allows to reconstruct the meta-information being embedded in the audio information.

According to an embodiment of the invention, the correlation signal is obtained by convoluting the modulation signal and the audio information in the frequency domain of the signals. The modulation signal is obtained for the correlation basis. The correlation basis is defined within a certain frequency sub-range being one of a plurality of frequency sub-ranges forming the total applicable frequency range. The correlation basis is mapped to each of the frequency sub-ranges comprised by the total sub-range analogously to the mapping of the code bases in conjunction with the coding of the meta-information.

According to a sixth aspect of the invention, a method for retrieving user provided information provided by the information history functionality is provided. The user provided information is organized for retrieval in accordance with the method for organizing user provided information of a mobile terminal device according to an embodiment of the invention. A request is received. The request includes request information which instructs to retrieve certain user provided information identifiable by comparing request information with meta-information (labeling information and/or indexing information) having being assigned to the user provided information organized in the history storage. In case of matching, the user provided information is retrieved accordingly and a response, including the retrieved user provided information, is returned.

The request may further instruct the filter and/or sort the retrieved user input information. The filtering may be operated in accordance with filtering information being included in the request and the filtering may be operated in conjunction with the meta-information (labeling information and/or indexing information) being assigned to the user provided information. The sorting may be operated in accordance with sorting information being included in the request and the sorting may be operated analogously in conjunction with the meta-information (labeling information and/or indexing information).

The matching of request retrieval information and the meta-information may require to perform the aforementioned method for extracting meta-information from a user provided audio information which has embedded the meta-information according to an embodiment of the invention.

According to an embodiment of the invention, the retrieving of the user provided information comprises a retrieving of a referencing information or address information being associated to the user provided information to be retrieved and retrieving the user provided information in accordance with the referencing information or address information from a second storage area. The referencing information may be stored in a first storage area in conjunction with the meta-information which allow the retrieval.

According to an embodiment of the invention, membership grades being associated to user provided information being handled by the information history functionality may be used to derive a reliability measure of the matching user provided information stored in the history storage. The reliability measure may serve for filtering the matching user provided information, e.g. by rejecting matching user provided information being associated with a membership grade below a pre-defined/user-defined membership grade threshold, or may serve for sorting the matching user provided information in a sequence corresponding to the individual membership grades.

According to a seventh aspect of the invention, a method for providing storage capacity for organizing user provided information is provided. The user provided information is organized with meta-information according to any one of the aforementioned methods with respect to any embodiment of the invention. Basically, the method relates to a providing of the storage capacity for storing and the providing of retrieval capacity for retrieving the previously stored user provided information.

The providing of the storage capacity is performed by receiving a request for storing user provided information or at least a part of user provided information. Therefore, the request includes the part of the user provided information to be stored and referencing information also to be stored. The referencing information serves to allow a previous retrieval by the means of the referencing information. Accordingly, the part of the user provided information included in the request and the referencing information is stored in an adequate way.

The providing of the retrieval capability is performed by receiving a request for retrieving at least a part of user provided information. Therefore, the request comprises referencing information which references (uniquely) the part of the user provided information to be retrieved. The retrieval of the part of the user provided information employs the referencing information which has been stored during the storing of the part of the user provided information. A request response is coded on the basis of the retrieved part of the user provided information and transmitted back to the requesting device.

According to an embodiment of the invention a software tool method for organizing and retrieving of user provided audio information with meta-information is provided. The software tool comprises program portions for carrying out the operations of any aforementioned method according to any embodiment of the invention when the software tool is implemented in a computer program and/or executed.

According to an embodiment of the invention, there is provided a computer program for organizing and retrieving of user provided audio information with meta-information. The computer program comprises loadable program code portions for carrying out the operations of any aforementioned method according to any embodiment of the invention when the program is executed on a processing device, a computer or a network device.

According to an embodiment of the invention, a computer program product is provided which comprises program code portions stored on a computer readable medium for carrying out the aforementioned methods for organizing and retrieving of user provided information with meta-information according to any embodiment of the invention when the program product is executed on a processing device, a computer or network device.

According to an embodiment of the invention, computer data signal is provided. The computer data signal is embodied in a carrier wave and represents a program or program code portions which, when executed by a processor, causes the aforementioned method for organizing and retrieving of user provided information with meta-information according to any embodiment of the invention be carried out.

According to an eighth aspect of the invention, a mobile terminal device is provided which is capable to organize user provided information with meta-information in accordance with anyone of the aforementioned methods according to embodiments of the invention. The mobile terminal device comprises a component for obtaining (receiving) the user provided information and the context information being associated with the user provided information. Further, a component for assigning meta-information being obtained from the context information to the user provided information. A component for storing, a storage device, receives and stores the meta-information and the user provided information.

The user provided information is to be understood as data which has been generated, received, or which occurs in consequence to any user operation being performed against the mobile terminal device. The user provided information may be generated by employing user input means or may be received or obtained via any data communication interface provided by the mobile terminal device. It shall be further understood, that the user input means may be an arrangement of keys, a keyboard, a keypad or any other manually operable inputting component (joystick, pen etc), but also enhanced input means such as an audio sensor (microphone), a digital camera capable to take photos and/or image sequences (videos) and further sensor input. The data communication interface may be any interface able to receive, transmit or communicate electronic data of any type with a counterpart device, in particular transaction information and/or communication information are comprised. The context information is associated with the user provided information. It shall be understood, that context information e.g. includes information about a device application and/or device function currently active and to which the user provided information is originally related, position/location information, time information and any further information being available in parallel to the user provided information and being related (chronologically and/or logically) to the user provided information.

According to a ninth aspect of the invention, a mobile terminal device being capable to organize user provided information with meta-information obtained from calendar information is provided. The mobile terminal device is capable to perform anyone of the aforementioned methods according to embodiments of the invention. The mobile terminal device comprises a component for obtaining calendar information from an electronic calendar application implemented in the mobile terminal device. A component for matching allows to match the calendar information and the user provided information and a component for obtaining meta-information allows to obtain meta-information from the matching calendar information.

According to a tenth aspect of the invention, a mobile terminal device is provided which is capable to organize user provided audio information with meta-information. The mobile terminal device is capable to perform anyone of the aforementioned methods according to embodiments of the invention. The mobile terminal device comprises a component for obtaining the user provided audio information and for obtaining additional user provided information being provided in parallel to the recording and storing of the user provided audio information, a component for recording the user provided audio information and a storage component for storing the user provided audio information. Further, a component for obtaining context information is comprised. The context information includes user input information generated in consequence on a user action during the recording and storing of the user provided audio information. The context information is logged and supplied to a component for generating meta-information comprising information about the additional user provided information being obtained and the context information being logged.

According to an eleventh aspect of the invention, a mobile terminal device being capable for organizing user provided audio information with meta-information by embedding meta-information into the user provided audio information is provided. The mobile terminal device is capable to perform anyone of the aforementioned methods according to embodiments of the invention. The mobile terminal device comprises a set of code bases. The code bases represent a plurality of coding symbols. Each code basis of said set of code bases defines an at least one frequency. A component for mapping maps the meta-information into said a plurality of coding symbols and a component for obtaining user provided audio information having embedded the meta-information is able to embed the mapped meta-information into the user provided audio information.

According to a twelfth aspect of the invention, a storage device capable to provide storage capacity for organizing user provided information being provided with meta-information is provided. The storage device comprises an interface component for receiving a request for storing, for receiving a request for retrieving and for transmitting a response in consequence on said request for retrieving. The request for storing is a request for storing of at least a part of user provided information being transmitted from a mobile terminal device which performs a method for organizing user provided information with meta-information according to any one, of the claims 1 to 29. This request comprises the part of the user provided information and referencing information to be stored. The request for retrieving is a request for retrieving at least a part of user provided information transmitted from the mobile terminal device which performs a method for organizing user provided information with meta-information according to any one of the claims 1 to 29. That request comprises referencing information allowing to retrieve the requested part of the user provided information.

A storage component is capable to store the user provided information and the referencing information such that the user provided information is retrievable in conjunction with the referencing information. A component for retrieving enables to retrieve the part of the user provided information which is requested by the request for retrieving in accordance with the referencing information being included therein and a component for generating a response prepares the response including the retrieved part of the user provided information to be transmitted to the requesting mobile terminal device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4b shows a sequence of operations in time illustrating an example usage sequence according to an embodiment of the invention;

FIG. 4c shows a possible example description in view of the example usage sequence presented in FIG. 4b and according to an embodiment of the invention;

Figure 1A:
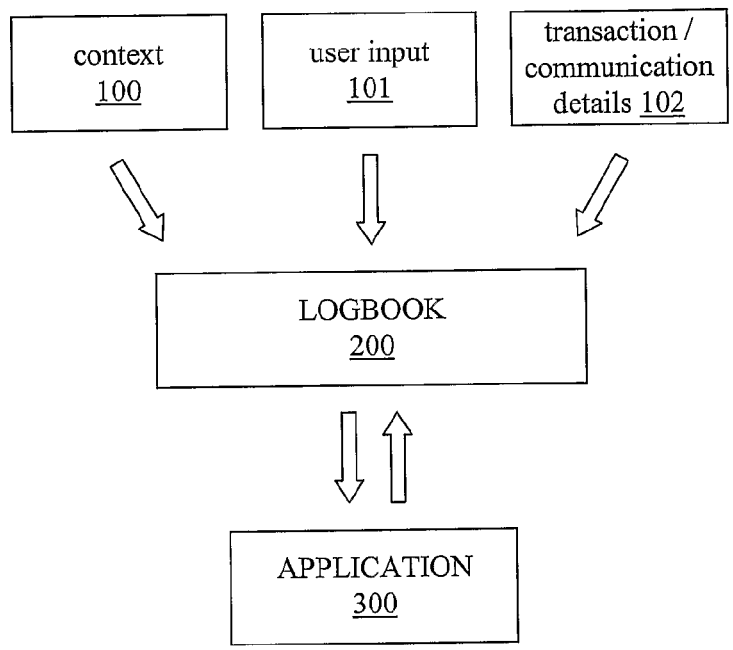
FIG. 1a shows a block diagram illustrating the structural organization and interaction of a • personal logbook according to an embodiment of the invention.

Same or equal parts, features and/or operations shown in the figures will be referred to using the same reference numerals. The following description of embodiments of the present invention is partitioned into independent sections each of which relates to one certain aspect of the overall inventive concept.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Users of electronic terminal devices develop personal usage patterns based on their preferences and recurring needs. An example being based on mobile communication terminals is the "last calls" function where a list of phone numbers consisting of a predefined number of put through telephone calls is presented to users through which the users are allowed to scroll to select one of the presented list entries. The list of phone numbers is often associated with the personal telephone directory established and edited by the users themselves. Users tend to select one of those numbers quite often to initiate a new call. The idea in the case of the phonebook is to store the last called numbers and offer them also for future use.

This concept will be generalized to other usage domains and will be designated as "personal logbook" in the following. FIG. 1a illustrates the structural organization and interaction of a personal logbook according to an embodiment of the invention by means of a conceptional block diagram. The block diagram depicts three example information streams the information of which is passed to the personal logbook 200 for being logged, combined, classified, labeled, indexed and provided to be retrieved. The three example information streams include a user input information stream 101, a context information stream 100 and a transaction/communication details information stream 102.

The basic input parameters and properties of the personal logbook 200 are user input information, result information, e.g. resulting from the processing of the user input information and in conjunction with available and suitable context information. Typically, a user input is based on the input means provided by an electronic device such as a PDA, an electronic organizer, a mobile communication terminal device and related electronic data processing devices. User input means are operable by the user and the electronic device receives user input information corresponding to the operation of the input means. Correspondingly, one or several user inputs or input sequences operated by the following example input means are suitable for being logged:

keys, keypad, keyboard: keyboard/keypad input, where the individual character inputs are aggregated and which are to be associated with the application context, i.e. the current running device application or the current executed device function to which the keyboard/keypad input is passed on for being processed, for being parsed to effect a desired operation and the like. For example, a user input comprises an aggregated input of a character sequence representing a complete text string for a form field whose title is known from the application context such as a string which is supplied to a WAP browser to be parsed and interpreted as a URL address information;

optical pen: pen input, where the coordinate information may either be passed to an optical character recognition first to be translated in a text based information or represent a free graphics input being a sketch. For example, PDAs offer pen input capability to users for operating the PDAs;

audio detector (microphone): voice input, where the voice input is recorded as a voice memo to be reproduced later, e.g. in kind of a dictation machine, or the voice input is passed to a voice recognition which returns text information corresponding to the voice input. Such a voice recognition may be implemented directly in the electronic device having voice recognition capability or may be realized as a networked voice recognition service accessible via wireless or wired communications;

digital image receiver (CCD camera): image/video input, where images or image sequences (video) are stored directly or where only symbols are stored which are gained from the image/video input and represent recognized gestures;

sensors: additional sensor input, such as acceleration sensor information etc;

and further user inputs which can be received from input receiving means of the electronic device and which are suitable to control functions and/or applications thereof. For example further adequate input means may be any user operable input means such as a joy stick, touch pad etc.

Naturally, the user input information stream 101 is limited to the aforementioned information being received in consequence on a user input. The user input information stream 101 may be understood as user input information being obtained (received) in consequence on any user operation against the electronic device which also includes any information obtained (received) via any interface providing data exchange capabilities with any other counterpart device.

The context data/information is represented by additional information and conditions under which the user input is carried out or is obtained from the current operation state in which the electronic device is currently active. The context information may comprise:

position information of the device (if available), where the position information may be conveyed from a radio access network (location service enabled radio access network) or from a satellite position system (global position system)

time information of activity, i.e. information about the time at which the user input is received, information about the duration of time during which the user input is received, information about the time at which the user input starts/stops and related time information;

information about active application which has input/output focus during the user input, which receives the user input and more detailed to which feature of the active application the user input is dedicated;

environmental details (if available) like e.g. temperature, humidity/weather conditions, lighting conditions;

information about the mood of the user (if available);

and all other information which can be obtained by means of the electronic device and which are suitable as context-defining parameters. Especially, information available in conjunction with applications being operated on the electronic device such as calendar application, telephone directory, address book application and related application being employed for organizing dedicated information.

The transaction/communication details information is the third information stream 102 to be fed to the personal logbook 200. The transaction/communication details information may comprise the following information:

identity information about the sender of a message or a call which has been put through, e.g. calling phone number, vCard of sender, mood of sender (cf. context information);

information about E-commerce transaction details like recipient, (bank) account information, order description and pricing; and further status information about transactions including tracing information of transactions such as information about an order life cycle like order placed—order acknowledged/accepted—delivery started—delivery on hold (e.g. a download)—delivery resumed—delivery finished—order billed—order paid.

The transaction/communication details information may be regarded as being part of the context information.

The presented classification of available information into three different information streams is be understood as an example embodiment according to the concept of the present invention to enlighten a possible but not necessary classification of the information being logged by the personal logbook 200. It is to be noted, that the classification of information streams which appear in conjunction with the operation of an electronic device and which are capable to be logged into different information streams may be difficult, since certain information may be associated simultaneously with different information streams. The presented concept is also operable in conjunction with a single information stream including one, several selected or all available information. Further, the single information parts assigned to one of the presented example information streams represent single example information parts according to an embodiment of the invention. The inventive concept shall not be understood as being limited to these mentioned single parts of information.

The electronic device being in control of these information streams 100, 101 and 102 supplies the information streams to be personal logbook 200. Conceptionally, the task of the personal logbook 200 according to an embodiment of the invention may be split into three different subtasks:

Obtaining/receiving and logging user input information, context information, transaction information and further available information and processing the logged information for being stored.

This subtask may be performed automatically without requiring further user activities, i.e. such a logging operation may be a background activity. The information being obtained/received and logged may be determined by pre-defined and/or user-defined regulation defining the kind of information to be obtained/received and logged.

Maintaining and sorting information stored in the personal logbook in accordance with user-specific criteria or system specific criteria. This subtask may be also a background activity and the maintaining and/or sorting criteria may be pre-defined by the user.

Retrieving information in consequence on one or more retrieving instructions specifying certain filtering and/or sorting criteria to be applied for the retrieving of information from the personal logbook 200 and providing (presenting) the retrieved information. The one or more retrieving instructions may be transmitted from one or more applications 300 to the logbook 200 and the logbook 200 transmits the retrieved information back thereto.

The operation of the personal logbook 200 can be expressed in short by the following description. The personal logbook 200 automatically obtains/receives and stores all user input, the application context, location context and time context where this happened and all communication-related information from outside. The information is sorted in accordance with different (pre-defined/user-defined) criteria to facilitate a retrieving access to the stored information by the user. For example, the user is able to trace his or her input/ transactions since follow-up activities are most likely based on this context.

In view of the above described capabilities of the personal logbook 200 the advantages with respect to the information overload dilemma can be recognized. The technical pre-conditions to overcome the information overload dilemma are provided by the logbook which allows to store all information which are encountered in daily life of a user, starting from documents, through audio recordings up to full-day videos of user's life. This information and especially multimedia information may be useless without the implementation of the person logbook 200 which allows to organize this information automatically or at least semi-automatically. Otherwise the user cannot concentrate on the relevant content and use it for the future.

Figure 1B:
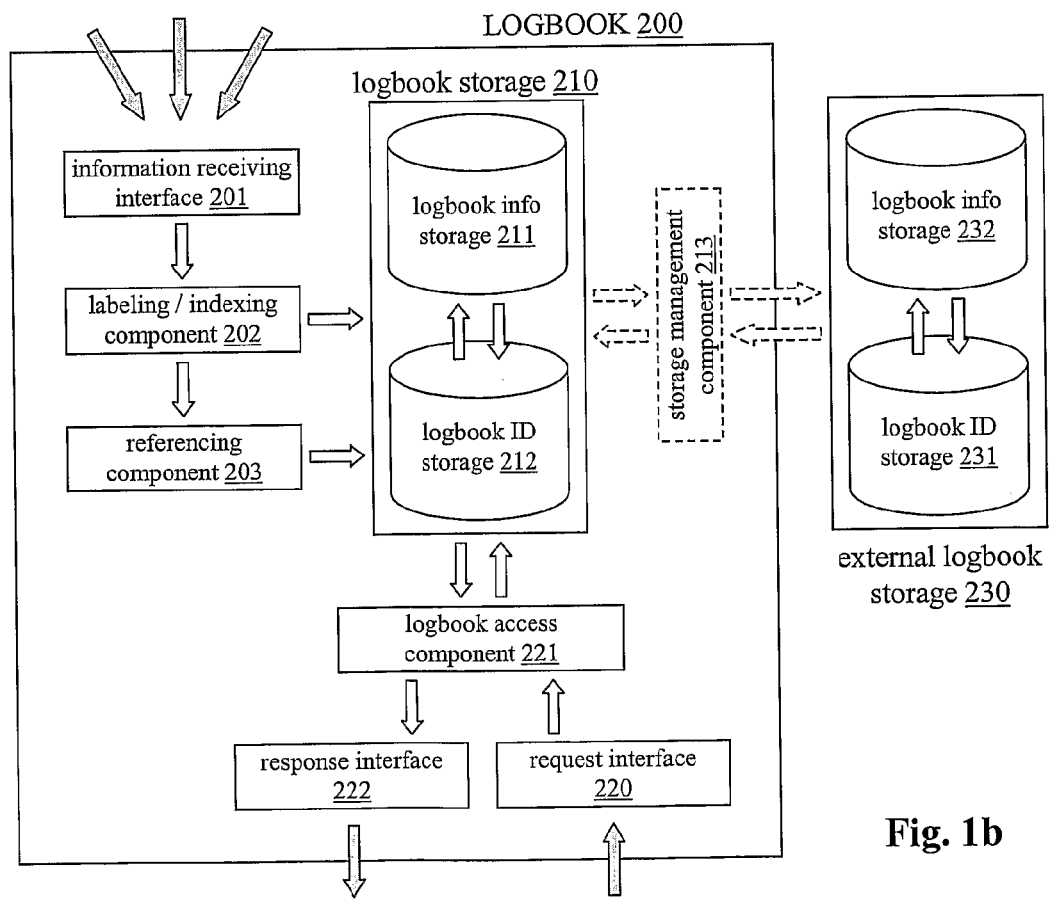
FIG. 1b shows a block diagram illustrating components allowing to constitute a personal logbook according to an embodiment of the invention.

FIG. 1b illustrates components allowing to constitute such a personal logbook 200 depicted in FIG. 1a according to an embodiment of the invention by means of an example embodiment of the personal logbook 200. The personal logbook 200 may be implemented by the means of an information receiving interface or information obtaining component 201, a labeling/indexing component 202, a referencing component 203 and a logbook storage 210. These components 201, 202, 203 and 210 relate to the first and second subtasks which are mentioned above in view of the principle operation of the personal logbook. The depicted logbook storage 210 may be supported by an external logbook storage 230 which may be connected to the personal logbook 200 and the logbook storage—210 by a storage management component 213, respectively, which allows to evacuate information thereto and to retrieve information therefrom. Moreover, the logbook storage 210 may be completely substituted by the external logbook storage 230 being operated as the only storage component for storing logbook related information.

Further, the personal logbook 200 includes components which allow to retrieve information from the logbook storage 210 and/or, if present and employed for storing, from the external logbook storage 230. The request interface 220 is able to receive one or more requests for information from e.g. an application which has generated an information retrieving request for example in consequence to a user input. Such a request includes one or more commands instructing to retrieve certain information e.g. in accordance with one or more retrieving, sorting and/or filtering criteria. A logbook access component 221 is responsible for the access to the logbook storage 210 as well as to the possibly available external logbook storage 230. A response containing information from the logbook storage 210 and external logbook' storage 230, respectively, corresponding to the request for information is generated in cooperation with the logbook access component 221 and the response interface 222 to be transmitted to one or more applications which are capable to received the response or to be returned to the application which has initiated the request for information, respectively.

Figure 1C:
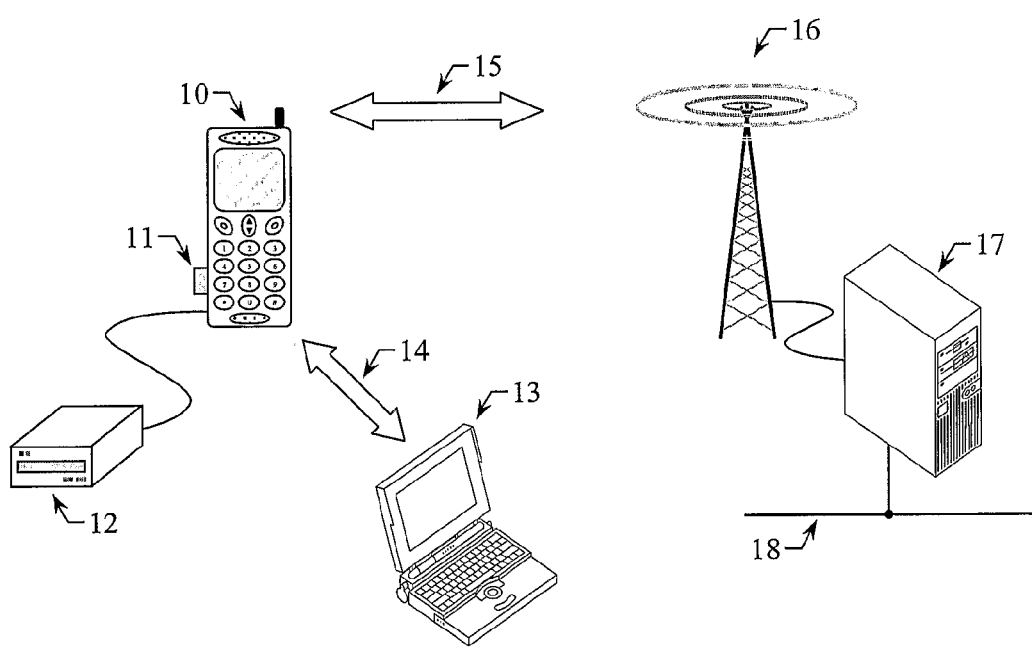
FIG. 1c shows a block diagram illustrating a suitable device environment which comprises further storage device cooperating with the personal logbook according to an embodiment of the invention.

FIG. 1c illustrates a suitable device environment which comprises storage solutions/storage components and storage devices cooperating with the personal logbook according to an embodiment of the invention. The aforementioned external logbook storage 230 may be realized in a large number of ways. The depicted device environment shall illustrate a couple of embodiments of the external logbook storage 230 without limiting thereto. The device environment comprises an electronic device 10 having implemented the personal logbook according to an embodiment of the invention, a detachable connected storage component 11, an external storage device 12 being coupled to the electronic device 10, a local external storage solution 13 and a networked external storage solution 17 each offering storage space/capacity for being used in conjunction with an embodiment of the personal logbook according to the invention.

The detachable connected storage component 11 can be realized technically in form of any memory cards (SD card, MultiMedia card, . . . ) being based on FLASH memory, magnetic memory, ferrite memory etc., which are today employed in mobile electric device products or in form of any once-writable or re-writable storage media, such as optical recording media (e.g. CD-R, CD-RW, a (once-/re-)writable DVD media according to any DVD standard), magnetic recording media and the like. Any known mass storage media are suitable for be used. Correspondingly, such a mass storage technology may be employed as an external storage device 12 being coupled to the electronic device 10 via a wired or a wireless connection. Alternatively to a dedicated storage component 11 or a dedicated external storage device 12 a processing device 13 having implemented a mass storage component such as a desktop computer or a notebook may be employed in agree with the illustrated and described external logbook storage 230. Analogously, a wireless or wired communication connection provides communication with such a processing device 13. Additionally, a networked storage device 17 connected via a wireless or wired communication network 15 to the electronic device 10 may provide a dedicated storage space for being employed as external logbook storage 230.

Any of the wired and/or wireless connection technologies may be used for realizing communication of the electronic device 10 with one of the illustrated external devices 12 and 13. For example, the universal serial bus, the firewire bus or any other serial but also parallel bus may be used for wired connection, whereas Bluetooth, wireless local area network, wireless local loop, infrared communication and related wireless communication standards allow to realize a wireless communication 14.

Such a networked storage solution as illustrated in conjunction with the networked storage device 17 may be provided by a networked storage service which may be accessed via the interne 18, a wide area network, a local area network, a public land mobile network 16 (such as GSM, PCN, DCS, PCS, UMTS, etc.) or any combination thereof. The networked storage device 17 has the advantage that the provided storage capacity may not be limited due to any storage capacity limitations as given in conjunction with detachable storage media and the provided storage capacity may be always available (on condition that a communication link to the networked storage device 17 is available).

A more detailed description of the operations of the personal logbook 200 and the components comprised in the personal logbook 2000 will be discussed in combination with the following operational sequences relating to logging/ maintaining of the personal logbook 200 and the retrieving of certain logged information from the personal logbook 200.

Figure 2A:
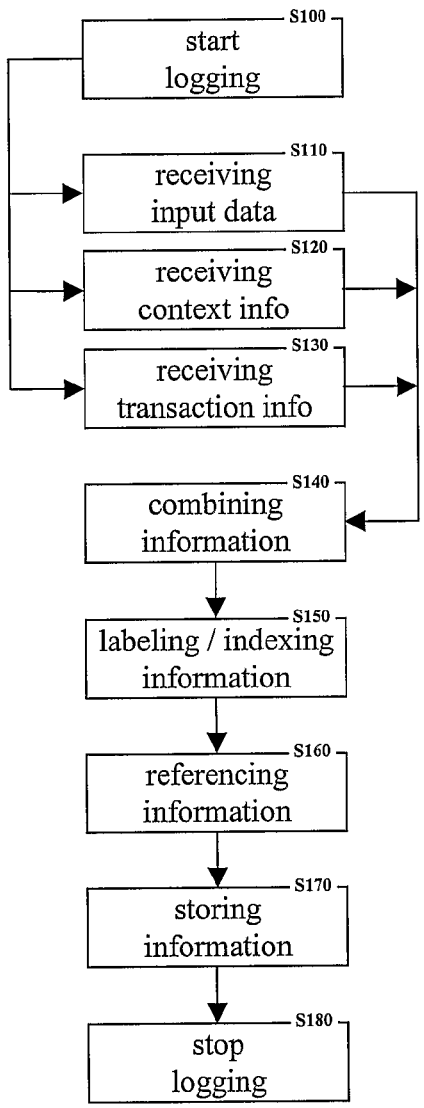
FIG. 2a shows a flow chart depicting an operational sequence for operating and in particular for establishing logged information in a logbook component such as illustrated in FIG. 1b according to an embodiment of the invention, respectively.

FIG. 2a shows a flow chart depicting an operational sequence for operating and in particular for 5 establishing logged information in a logbook component such as illustrated in FIG. 1b according to an embodiment of the invention, respectively.

In an operation S100, the logging operation of the personal logbook 200 is started.

In operation S110, operation S120 and operation 5130, user input information, context information and/or transaction information/communication details information is obtained and received, respectively. In view of the block diagram the personal logbook 200 and in particular the information receiving interface 201 receives this set of information. In accordance with the current operation and/or the operational state of the electronic device having implemented the personal logbook 200 only a part of the aforementioned information or additional information may be available for logging. The kind of information to be logged by the personal logbooks 200 may be pre-defined or user-defined and all available information in accordance with the (pre-, user-) defined logging regulations are logged.

In an operation S140, the received information including at least a part of user input information, context information and/or transaction information/communication details information is combined to a set of information. That means, timely simultaneous received information, logically related and/or logically associated information and the like is taken into relationship and formed to a set of information resulting in an information record. Received user input information is associated with received context information by considering time information or simultaneously receiving thereof, respectively. Received communication details information and/or transaction information are associated with received context information by considering time information or simultaneously receiving thereof, respectively. Moreover, communication details information and/or transaction information may be received in a time interval and may be related by logical relationship.

In an operation S150, the resulting information record is labeled and indexed, respectively, i.e. is provided with labeling information and indexing information, respectively. The labeling information and indexing information is used for retrieving the information record or parts of the information record, e.g. subsequently in consequence on an information request. The labeling and indexing information may be a set of individual meta-information, respectively, extracted from the information record and allowing to retrieve, select and/or evaluate the labeled and/or indexed information record in a useful and effective manner. The labeling and indexing information themselves are obtained (extracted) from the information record by employing individual information from the user input information, context information and/or transaction information/communication details information. The labeling information may refer to a certain device operation in conjunction to which the information record has been formed from the received information, i.e. the labeling information may indicate or designate the device application or device function in consequence to which the information has been received and to which the received information relates.

For example, a number is dialed by the user of a mobile communication enabled terminal device having embedded the personal logbook 200 according to an embodiment of the invention. The user input information may include either a sequence of numbers representing the dialed telephone number or a name entry from the personal telephone directory associated with a corresponding telephone number. As context information the moment of initiating and termination of the telephone call, the duration of the telephone call, the current date, the current geographical position and further available context information are associated with this user input information. Correspondingly, an information record may be formed from this information and a label information "telephone number" or "telephone call" may be assigned to this information record wherein that label information may be extracted from the context information providing information about the current focused application, herein the telephone call application. Further, parts of the available context information may be employed as indexing information. A consecutive retrieving operation may instruct to deliver all telephone calls having been logged, or all telephone calls— having been logged on a certain date, within a certain period of time, at a certain geographical position and the like such that the indexing information acts as information enabling a filtering of retrieved information or analogously a sorting of retrieved information, i.e. sorting by time/date, duration of time, geographical position, etc.

Further for example, a user of a mobile communication enabled terminal device having embedded the personal logbook 200 according to an embodiment of the invention accesses the internet by the means of a WAP (wireless application protocol) browser for paying a hotel bill by electronic payment employing the service of an e-commerce service provider. The personal logbook receives user input information corresponding to the WAP-browser usage, e.g. amongst others a URL (universal resource locator) of the service provider and user input information of a form filled out by the user to order the payment such as address and account information about the hotel. The user input information are analogously accompanied by context information such as the aforementioned moment of initiating and termination of the use of the WAP-browser, the current date, the current geographical position and further available context information to be are associated with the user input information. Additionally, transaction information is also available and received by the logbook, where the transaction information may comprise a (unique) transaction ID (identification sequence) and individual information about the addressee, account, amount etc. The resulting information record may be labeled as "transaction" and indexed with selected individual context information and/or individual transaction information.

Alternatively, the received information may be combined in two information records, one relating only to the WAP-browsing usage and the other relating to the transaction. Both information records are formed in combination with the aforementioned context information. Correspondingly, the first information record may be labeled "WAP browser" and the second information record may be labeled "transaction".

Further transaction information may be received in consequence on the initiated transaction. This transaction information are logged in conjunction with context information. The aforementioned transaction ID may be comprised in all transaction information may be received in consequence on the initiated transaction such that a creating of an indexing information based on the transaction ID allows a user to retrieve all transaction information relating to one and the same transaction procedure even in case the transaction information are logged at different moment of times. Alternatively, all transition information logged at different moment of times may be combined into on information set by a logical relationship being based on the unique transaction ID.

In an operation S160, the information record is referenced. In terms of a logic separation the personal logbook 200 can be completely separated from the logbook storage where the actual information records are stored. In this case of a separation the personal logbook 200 stores only relationships between different instances of information records and points to the actual logbook storage in order to allow information record retrieval. The referencing of the information record allows to determine linking information suitable for retrieving the information record from the actual logbook storage such as an external logbook storage 230. More precisely, the linking information, labeling information and/or the indexing information are stored in the personal logbook 200 itself, i.e. in the logbook ID storage 212, which allow a useful retrieving, filtering, selecting and/or sorting of the stored information records whereas further information associated with the information stored in the logbook ID storage 212 of the logbook 200 is evacuated to the actual logbook storage, i.e. to the external logbook storage 230 and more precisely to the logbook information storage 232 outside of the personal logbook 200.

In practice, the above proposed hard separation of the personal logbook and the actual logbook information storage might elaborate, instead only larger portions of information such as audio and video clips might be moved to the external logbook storage 320 and more precisely in the external logbook information storage 232, respectively, but small portions of information such as textual information is kept in the personal logbook 200, the logbook storage 210 and more precisely in the logbook information storage 211, respectively.

If necessary, the linking of information stored in the logbook storage 210 of the personal logbook 200 and stored in the external logbook storage 230 coupled to the personal logbook 200 may be established and realized by the aforementioned referencing information being stored in a dedicated storage area, i.e. in the logbook ID storage 212 of the logbook storage 210 included in the personal logbook 200 and the corresponding counterpart logbook ID storage 231 of the external logbook storage 230. The storage management component 213 manages the information exchange between the logbook storage 210 embedded in the personal logbook 200 and the external logbook storage 230.

The proposed concept, to separate information organization (the personal logbook) from information storage so that also the logbook information alone is valuable for the user, whereas (memory-intensive) content is handled separately. While logging of basic information can already be implemented on electronic devices (terminals) with modest memory budget, the full benefits of a separation of information and its organization are apparent in electronic devices (terminals) with mass storage capability, such as an optical re-writable storage medium (re-writable computer disk (CD), digital versatile disk (DVD) etc), a magnetic storage medium (hard disk etc), a permanent memory medium (FLASH memory, magnetic memory, ferrite memory etc), a network based or internet based storage solution and the like, which is connected locally (implemented in or detachably connected with the electronic device) or connected via a communication network to the electronic device.

As an example, it may be assumed that a user of a mobile communication enabled processing device (such as a PDA or an electronic organizer with a communication adapter or a mobile communication terminal device) having implemented the personal logbook according to an embodiment of the invention downloads a video presentation (slide show, pictures, large electronic document). The downloaded information is logged by the personal logbook in conjunction with the corresponding context information, that means that the complete video presentation (slide show, pictures, large electronic document) is present in the logbook storage. Especially, mobile processing device are commonly equipped with limited storage capacity due to their mobility (size, weight) and usability. The evacuation of such information to an externally coupled storage with high storage capacity may be necessary.

In an operation S170, the information is stored. The storing of the information record and labeling, indexing and/or referencing information is performed in accordance with the above described storage solution chosen for the personal logbook 200. The labeling, indexing and/or referencing information as well as the information record may be organized in a data base which allows to access the labeling and indexing information in an efficient way for identifying one or several information records which match with one or more retrieval instructions.

Since the amount of information can be enormous, especially in view of multimedia information such as video clips, audio clips requiring extensive data storage capacity, a policy/regulation of data conservation and deletion has to be in place.

Independent from the chosen storage solution the total storage capacity is always finite such that a policy/regulation what information to keep and what information to discard is required. By default a life time can be associated with all information (records), meaning in practice that the oldest information are deleted first. The deletion of timely expired information may be operated automatically at the moment of expiration or at the moment of requiring storage capacity which is occupied by expired information and which is required for storing newly information. Alternatively expired or older information can be moved to an archive medium which can be embodied analogously to the aforementioned external storage solution for clearing up the logbook storage capacity. An archive medium may be a mass storage of a personal computer (PC), a removable storage medium or a network-based storage solution being connected detachably with the electronic device and the personal logbook for archiving purposes. The same policy/regulation can be applied to both, the logbook, the logbook storage and/or the external logbook storage.

In an operation S180, the logging information with respect to a certain set of user input information, context information and/or transaction/communication details information is finished. The logging operation embodied as the presented operational sequence being one possible embodiment according to the invention may be operated as a background process of the electronic device having implemented the personal logbook. As soon as a set of information to be logged is received by the personal logbook the aforementioned logging operation is performed by the electronic device and the personal logbook, respectively.

A personal logbook is most appealing to a user if the collected information can be utilized with a broad range of applications. The critical operation of the above described logging process is the labeling/indexing operation S150 since only a useful labeling and indexing ensures the potential of the logbook information allowing for managing efficiently and usefully the huge amount of collected information.

Figure 2B:
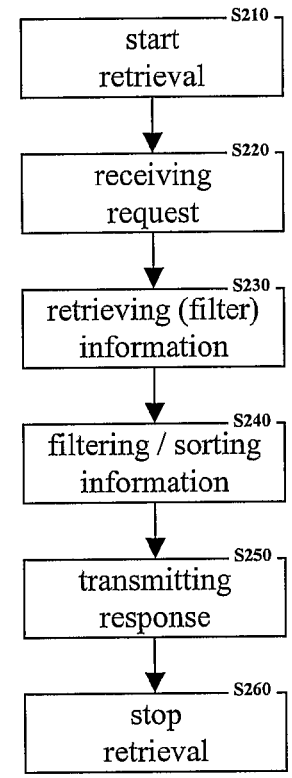
FIG. 2b shows a flow chart depicting an operational sequence for operating and in particular for retrieving information from a logbook component such as illustrated in FIG. 1b according to an embodiment of the invention, respectively.

FIG. 2b shows a flow chart depicting an operational sequence for operating and in particular for retrieving information from a logbook component such as illustrated in FIG. 1b according to an embodiment of the invention, respectively.

In an operation S210, the retrieving operation for retrieving information from the personal logbook 200 is started.

In an operation S220, a request for retrieving information from the personal logbook is received. Such a request may be received by the aforementioned request interface 220 of the personal logbook 200.

In an operation S230, the one or several information records are retrieved from the personal logbook 200. The request includes instructions which specifies the kind of information to be retrieved from the personal logbook 200. The request specifies a certain designation or combination of designations in accordance with which previously stored information records may be selected. In view of the labeling and/or indexing operation S140 referred to in FIG. 2a for example, the instructions command e.g. the logbook access component 221 to retrieve information records associated with a certain labeling information, associated with a certain indexing information and/or any combination of information thereof.

In an operation S240, the retrieved information records matching with the instructions for retrieving which are included in the request may be further sorted in accordance with additional instructions comprised by the request. The sorting of retrieved information records may analogously be based on a certain designation or combination of designations. In view of the labeling and/or indexing operation S140 referred to in FIG. 2a for example, the instructions command e.g. the logbook access component 221 to sort the retrieved information records in accordance with a certain associated labeling information, a certain associated indexing information and/or any combination of associated information thereof.

The operation S230 and the operation S240 may be a combined operation such that the retrieving, filtering and/or sorting is operated in a combined operation.

In an operation S250, the retrieved, filtered and/or sorted information records are transmitted to a certain application executed on the electronic device. The addressed application may be coded in the request.

In an operation S260, the retrieving operation for retrieving information from the personal logbook 200 is finished.

In the operation 5230, the retrieving of information in accordance with instructions comprised by the request may involve the retrieving of information from an external logbook storage acting as evacuation storage. The selection of information records which are matching in accordance with the information request may be performed in conjunction with the logbook ID storage 212 including labeling information, indexing information and/or linking (referencing) information. The actual information are retrieved by employing the corresponding linking (referencing) information from the evacuation storage, i.e. the external logbook storage 230 including a corresponding logbook ID storage 231 and a logbook information storage 232 including the information to be retrieved.

For example in view of a mobile communication terminal device having implemented the personal logbook according to an embodiment of the invention, a request for retrieving information may be generated and transmitted to the personal logbook by user selection of a fixed device feature or application feature such as the command (operation menu item) for retrieving the last dialed telephone numbers, the last received telephone calls or the last missed telephone calls. The generation of a corresponding request for retrieving information about the last dialed telephone numbers, the last received telephone calls or the last missed telephone calls from the personal logbook may be initiated by selecting a certain application function or by operating a certain dedicated key of the mobile communication terminal device.

Since the logbook logs all user input information, context information and communication details information, the corresponding respective information to be retrieved is present in the personal logbook and are presented to the user correspondingly. Similarly, a history list of last transactions and the like may be requested by the user and finally presented correspondingly to the user.

For example in view of an electronic device having implemented the personal logbook according to an embodiment of the invention, a request may comprise a user inputted text string (e.g. a name, an address etc) in accordance to which information records are to be retrieved which include a matching text information. This example can result in a response including a plurality of different information records, such as an information record relating to a dialed telephone number, an information record relating to a calendar entry, an information record relating to an editing of the personal telephone directory and further information records containing the inputted text string. In order to retrieve matching information records from the personal logbook the inputted text string may be compared with the labeling and/or indexing information associated to the information records or may be compared with the whole information content of the information records.

In view of an electronic device having implemented the personal logbook according to an embodiment of the invention, a request may comprise information being associated to an application context. For example a user currently scrolls through the personal telephone directory and discovers a name to which he wants to retrieve further information. On user instruction, a request for retrieving information from the personal logbook is generated, which comprises for example the designation of the discovered entry of the personal telephone directory. Correspondingly, the personal logbook serves all information logged and stored therein which match with the provided designation extracted from the current applicational context. The generation of logbook information request in accordance with certain applicational context is also applicable to other applications and/or device functions having an analogous context.

The retrieved and finally presented logbook information in consequence on a request may be filtered or sorted in a predefined or user-defined way. History lists are usually sorted chronologically (backward) and limited to a certain number of entries (e.g. ten entries). Alternatively, the sorting of the retrieved information records may be based on a usage frequency information, that means, that information records associated with a low usage frequency are sorted at the end of a resulting sequence of information records or are filtered out. Further sorting and filtering procedures are possible since the context information offers a huge number of individual information allowing an effective and useful sorting and filtering.

The personal logbook may be based on a data base technology for organizing the described storing structure. Moreover the coding of the labeling/indexing information may be based on a device independent markup language coding. Suitable coding technology for the data being managed by personal logbook may be a coding technology in accordance with the extended markup language (XML) or binary encoded XML in conjunction with a corresponding document type description (DID) and related markup language representations. The content and presentation/organization of the logbook data may be structured separately and the content can be referenced by an addressing information (referencing information) like provided with a uniform resource locator (CTRL), uniform resource indicator (URI) and comparable resource addressing schemes.

The following sections will relate to different operations performed by the personal logbook and relate to certain user provided information to be logged for being provided to be retrieved. A first detailed description will relate to labeling and/or indexing user provided information with information obtained from an electronic calendar and from calendar entries, thereof. A second detailed description will relate to labeling and/or indexing user provided audio information with information being obtained from the user actions being operated during the audio recording and provided by user actions during the audio recording. A third detailed description will relate to a method for embedding information of any type into a user provided audio information. Especially, the method defines a new type of markup language encoding being based on a language encoding system and alphabet for embed characters (symbols) of any mark-up language around or within the audio clip.

Context Labeling of Multimedia Information

As aforementioned in view of the personal logbook but also in regard to common retrieval systems for information and more particular multimedia information (data) retrieval systems such systems have to make use of reliable attributes (herein denoted also as labeling information and/or indexing information) in order to allow reliable retrieval and provide for useful results. However, most of the attributes that can be extracted automatically from multimedia information such as video or audio sequences may be either less significant from a perspective of a user—like, e.g., colors, textures, etc.—or less reliable—like, e.g., persons, objects, etc.

Existing multimedia information retrieval systems being state of the art exhibit several disadvantages. In case of a manually labeling of the multimedia information high reliability may be achieved, where high reliability shall specify a high precision of retrieval results which is of course needed and desired. But the manually labeling forces the user(s) of such a multimedia information retrieval system to maintain reliably the labeling with useful labeling information comprehensible and employable even for future use. Alternatively, the labeling of the multimedia information may be based on an automatic data analysis, such as detection of persons within the multimedia information, e.g., face recognition or speaker (voice) recognition, which is a demanding process requiring high data processing capability which may not be available. In addition, good visual models or auditory pattern are needed for all the persons that are to be recognized visually or auditorily. Thus, persons that are not contained within some model/pattern base cannot be recognized. Moreover, multimedia information that is considered as being relevant with regard to a specific person is restricted to those information objects that directly contain this person, i.e., its face, its voice in case of referring to the automatic recognition.

Therefore, the present invention relates further to a method for labeling information and more particular multimedia information with calendar data resulting in both highly reliable and cost efficient attributes applicable for retrieval thereof. The inventive concept makes use of calendar entries in order to label/index information. This kind of labeling/indexing is supposed to be reliable because the context information obtained therefrom has been contributed by the user manually itself and the employing of this manually entered context information is cost-efficient since this tapping of user knowledge is only targeting information that has already been stored by user within its personal calendar.

The following description of labeling/indexing information will be given with respect to multimedia information which may primarily include images, pictures, legacy documents, slides sequences, video sequences etc which have common that the extracting of reliable information for labeling and/or indexing is difficult or even impossible. For the above given introduction is should be understood that even the description refers to multimedia information the inventive concept is not limited thereto since it is applicable to any information.

The usage of electronic calendars is wide spread due to the advantages which such electronic calendars provide to users. Electronic calendars offers an editing, modifying, deleting of entries as often as required and/or desired without having any negative impact on the overall appearance. The calendar entries allow to define alerts triggered by time and/or date. Further, calendar entries may be inter-linked and intra-linked such that information may be passed from or to other applications such as contact information included in a calendar entry and being inter-linked with a personal telephone directory for selecting fast and easily a certain telephone directory entry and vice versa.

The employing of calendar information for labeling/indexing multimedia information requires certain perquisites relating to the semantic structuring of the calendar information as well as context information relating the multimedia information to be labeled/indexed.

All entries within the electronic calendar associated to a certain event should be semantically structured. As part of the semantic structure for calendar entries the following fields appear to be useful for the labeling of multimedia information:

"Date": This field shall contain a date at which the event takes place;
"Time": This field shall contain a moment of time or a period of time at which the event takes place;
"Who": This field shall contain the participants in the event in addition to the owner of the electronic calendar;
"Where": This field shall contain information about a location at which the event takes place;
"Notes": This field shall contain any free text notes;
"Type": This field shall contain information about the type of the event such as a meeting, a phone call, a telephone conference, a leisure activity etc; and
"Importance": This field shall contain a rating information about the importance of the event.

The presented semantic structure of calendar entries is just an example. The inventive concept primarily requires date and time information of calendar entries which are available independently from the specific implemented semantic structure due to the concept of the electronic calendar itself. The semantic structure of calendar entries relates to the labeling/indexing of the multimedia information. The labeling and/or indexing information finally associated with the multimedia information is extracted from the calendar entries such that the proposed semantic structure ensures that the extracted labeling and/or indexing information are reliable and sensible. The proposed semantic structure of calendar entries may be varied, modified or adapted to certain conditions without departing the scope of the inventive concept.

Figures 3A, 3B:
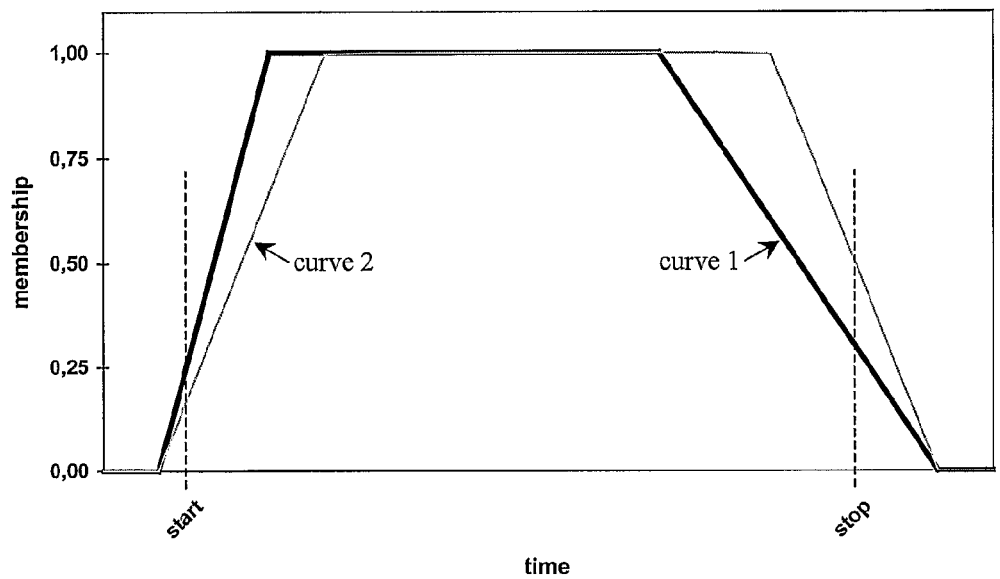
FIG. 3a depicts schematic calendar entries providing a semantic field structure for inputting information.
FIG. 3b shows a plot diagram illustrating example membership functions used for associating a membership grade to certain events according to an embodiment of the invention.

FIG. 3a depicts two schematically structured calendar entries #i and #j. The calendar entries include the above purposed semantic fields for structuring reliably the information comprised by the calendar entries. The first example calendar entry #i specifies a meeting (field "type") near the north pole (field "where") with Santa Claus and Rudy "Red-nose" Reindeer (field "who") a Friday, Dec. $6^{th}$, 2002 (field "date") starting at 6.00 pm and ending at 7.00 pm (field "time"). The calendar entry #i also includes a free text note (field "notes"). The second example calendar entry #j specifies a telephone conference (field "type") with Jane (field "who") a Friday, Dec. 6$^{th}$, 2002 (field "date") starting at 7.10 pm and ending at 7.25 pm (field "time"). The calendar entry #j also includes a free text note (field "notes").

In view of the example calendar entries #i and #j it can be recognized that the purposed semantic structuring of calendar entries is very useful since the semantic structuring ensures that information extracted from calendar entries and be used for labeling/indexing multimedia information represent reliable information guaranteeing high retrieval precision in case that a retrieval is based on such information. For-example multimedia information may be labeled and/or indexed with name information which can be extracted reliably from the "who" field or multimedia information may be labeled and/or indexed with place information which can be extracted reliably from the "where" field.

It shall be noted that this kind of extracting information from semantically structured calendar entries to be used for labeling/indexing can be transferred to any other structuring of calendar entries.

A point of time or a period of time has to be allocable to the multimedia information to be labeled/indexed. For example a personal collection of multimedia information are provided and available that reflects the personal recordings of reality of a user. This collection may includes continuous multimedia recordings, automatically taken multimedia snapshots or manually triggered multimedia snapshots where snapshot is used as a general term for performing recordings of any type of multimedia information comprising images, pictures, picture sequences, video sequences, legacy documents and the like. Timestamps are attachable to each entry of the personal collection of multimedia information where the timestamps may specify a moment of time or a period of time at which the recording has been performed.

The inventive concept is being based on the main idea to associate calendar entries and multimedia information by matching time information provided by the calendar entries with the time information (timestamps) associated to the multimedia information. A matching of the time information obtained therefrom allows to associate one or more calendar entries to one or more multimedia information sequences and particular to assign information extracted from the matching one or more calendar entries as labeling/indexing information of one or more multimedia information sequences. In other words, the electronic calendar is used to label/index multimedia information in a retrospective way.

Thus, the multimedia information is not only labeled with a specific labeling information where the labeling information is clearly assignable to the multimedia information, but also information that is extractable from the one or more matching calendar entries and that is related in a general sense.

In order to provide for a better accuracy for this kind of labeling, some assignment of so-called 30 membership grades (cf. Fuzzy Set theory) is sensible where the membership grade depends on the specific time dependency of a recording within the timeframe defined by a calendar entry.

FIG. 3b shows a plot diagram illustrating example membership functions used for associating a membership grade to certain events according to an embodiment of the invention. The abscissa comprises time values whereas the ordinate comprises membership grades. For example, a scheduled meeting begins at the moment of time "start" and ends at the moment of time "stop". The period of time between "start" and "stop" is the timeframe of this meeting. Both the moment "start" and "stop" are indicated in the plot diagram shown in FIG. 3b.

Two example membership functions are assigned to this timeframe. The membership function 1 and the membership function 2 both start rising from a membership grad value zero at a first distinct moment of time before the beginning of the timeframe of the calendar entry. Consecutively, the membership functions rise with different gradients up to the maximum membership grade value one before being valid within the timeframe for certain different periods of time. Subsequently, the membership functions drop again with different gradients and become zero at a second distinct moment of time after the ending of the timeframe of the calendar entry.

The rising of the membership function before the actual beginning of the timeframe and the dropping of the membership function after the actual ending of the timeframe ensures that multimedia information are associated with the respective calendar entry to which the timeframe belongs in case that the timestamp of the multimedia information is within the timeframe and is in the projecting periods of time defined by the exceeding definition area of the membership function in respect to the timeframe of the respective calendar entry. Examples will be given below to clarify this.

For simplicity the rising point (designated above as first moment of time) as well as the reaching point (designated above as second moment of time) of both membership functions 1 and 2 are chosen identical and the membership functions are defined as sectionalized linear curves. The rising and reaching point as well as the complete shape of the membership function is not only limited to the depicted example ones but any shape including to points of onset and termination is possible. The implemented possibility distribution should be based on the habits of the user who is the owner of both the multimedia information and the electronic calendar. However, the employed distribution has to be adjusted manually only once. Afterwards this adjusted distribution is valid for all multimedia information having been recorded in the past and will be recorded in the future and calendar entries, respectively.

Figure 3C:
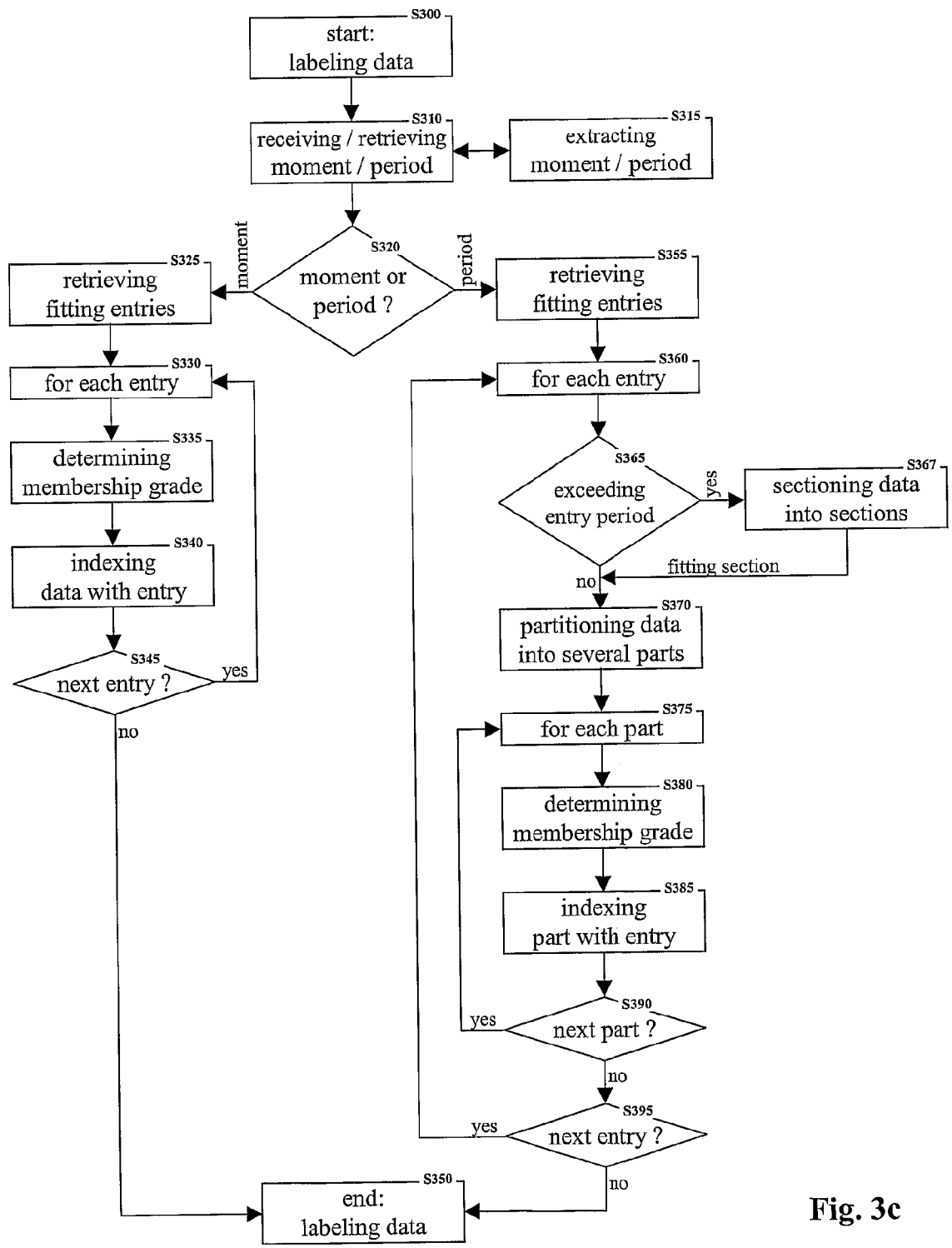
FIG. 3c shows a flow chart depicting an operational sequence for generating one or more labeling/indexing information according to an embodiment of the invention.

FIG. 3c depicts an operational sequence for generating one or more labeling/indexing information of multimedia information according to an embodiment of the invention.

Basically, the conceptional idea can be reduced to a selection of operations of the operations depicted in FIG. 3c. The object to be reached is to label and/or index multimedia information with one or more calendar entries and information extracted from the one or more calendar entries, respectively.

In a first step a timestamp is determined which is associated with the multimedia information to be processed. This timestamp is compared with the available calendar entries and the matching ones are selected thereof. Membership grades are obtained from the aforementioned membership function assigned to the timeframes of the matching calendar entries, where each membership grade relates to each matching calendar entry. Finally the multimedia information is labeled/indexed with the one or more matching calendar entries and information extracted from the one or more matching calendar entries are used for labeling/indexing the multimedia information, respectively.

The following description of an operational sequence relates to more detailed description of the method for labeling multimedia information according to an embodiment of the invention.

In an operation S300, the method for labeling a multimedia information is started.

In an operation S310, a moment of time or a period of time is obtained which relates to a recording event of the multimedia information, respectively. In an operation S315, the moment of time or the period of time associated with the multimedia information may be extracted from the multimedia information or may be retrieved from information being provided with or being assigned to this multimedia information, respectively.

In an operation S320, it is detected whether a moment of time or a period of time is associated with the multimedia information. In case of a moment of time being determined to be associated, the operational sequence is continued with an operation S325 whereas otherwise, i.e., in case of a period of time being determined to be associated, the operational sequence is continued with an operation S355.

In an operation S325, the total number of calendar entries available is searched to find matching calendar entries. That is, the obtained moment of time is compared with the timeframes and the extended timeframes of the calendar entries, respectively, where an extended timeframe is defined by the period of time in which the used membership function assigned to a timeframe of a calendar entry is not equal to zero. A calendar entry matches in case the moment of time is within the timeframe and the extended timeframe, respectively.

In an operation S330, for each matching calendar entry the following operations S335 to S345 are performed.

In an operation S335, a membership grade is determined from the membership function assigned to the timeframe of the current selected matching calendar entry in accordance with the moment of time being determined as being associated to the multimedia information. The membership grade is employed as a reliability value which indicates to which extent the currently selected calendar entry relates in any kind to the multimedia information.

In an operation S340, the multimedia information is labeled and indexed, respectively. The labeling/indexing is based on information being available from the current selected calendar entry, i.e. the whole calendar entry itself or the whole information contained in the calendar entry, selected information extracted from the calendar entry and the like, wherein the extracted information may be used in case that the calendar entry includes semantically structured information (fields).

In an operation S345, it is determined whether all matching calendar entries have been processed. In case there exists one or more remaining calendar entries which have not be processed up to now, the operational sequence returns to operation S330, whereas otherwise the operational sequence is continued with an operation S350.

In an operation S350, the method for labeling a multimedia information is competed.

In an operation S355, the total number of calendar entries available is searched to find matching calendar entries. That is, the obtained period of time is compared with the timeframes and the extended timeframes of the calendar entries, respectively, where an extended timeframe is defined by the period of time in addition with an overhead at the beginning and ending of the timeframe in accordance with the corresponding used membership function. A calendar entry matches in case the period of time overlaps with timeframe and the extended timeframe, the total number of calendar entries available is searched to find matching calendar entries. That is, the obtained moment of time is compared with the timeframes and the extended timeframes of the calendar entries, respectively, where an extended timeframe is defined by the period of time in which the used membership function assigned to a timeframe of a calendar entry is not equal to zero. A calendar entry matches in case the moment of time is within the timeframe and the extended timeframe, respectively, either completely or at least partially.

In an operation S360, for each matching calendar entry the following operations S365 to S395 are performed.

In an operation S365, it is determined whether the period of time being identified to be associated with the multimedia information matches partially with the timeframe and the extended timeframe of the current selected calendar entry, respectively. In case the period of time and the (extended) timeframe partially overlap the operational sequence is continued with operation S367. In case the period of time and the (extended) timeframe completely overlap and the period of time is within the (extended) timeframe, respectively, the operational sequence is continued with operation S370.

In an operation S367, the multimedia information is divided into one or more sections of multimedia information having corresponding sectionalized periods of time. One of the section with a corresponding associated sectionalized period of time matches with the timeframe and the extended timeframe of the current selected calendar entry, respectively. The remaining sections having corresponding associated sectionalized periods of time do neither match nor overlap with the into the timeframe and the extended timeframe of the current selected calendar entry, respectively.

In an operation S370, the multimedia information is partitioned into one or more parts of multimedia information having corresponding partitioned periods of time. If possible the partitioned periods of time may have substantially the same period value, e.g. 5 minutes. The value of the partitioned period of time of the last part obtained from the multimedia information by partitioning may differ from the desired period value. The period value of the partitioned periods of time may be pre-defined and/or user-defined.

In an operation S375, for each part the following operations S365 to S395 are performed.

In an operation S380, a membership grade is determined from the membership function assigned to the timeframe of the current selected matching calendar entry in accordance with the partitioned period of time. The membership grade is employed as a reliability value which indicates to which extent the currently selected calendar entry relates in any kind to that current selected part of the multimedia information.

In an operation 5385, the multimedia information is labeled and indexed, respectively. The labeling/indexing is based on information being available from the current selected calendar entry, i.e. the whole calendar entry itself or the whole information contained in the calendar entry, selected information extracted from the calendar entry and the like, wherein the extracted information may be used in case that the calendar entry includes semantically structured information (fields).

In accordance with the partitioning of the multimedia information such a partitioned multimedia information is labeled and indexed section-wise for a certain period of time, increasing the value of the assigned membership grade as a quantity for evaluating the retrieval reliability. The partitioning allows to establish a fine reliability value grid applied to the multimedia information.

In an operation S390, it is determined whether all parts of the partitioned calendar entries have been processed. In case there exists one or more remaining parts which have not be processed up to now, the operational sequence returns to operation S375, whereas otherwise the operational sequence is continued with an operation S395.

In an operation S395, it is determined whether all matching calendar entries have been processed. In case there exists one or more remaining calendar entries which have not be processed up to now, the operational sequence returns to operation S360, whereas otherwise the operational sequence is continued with an operation S350.

In an operation S350, the method for labeling a multimedia information is completed.

A following retrieval of information is preferably based on the typed labeling/indexing information being determined and associated to the multimedia information, however, free text search is possible as well.

Figure 3D:
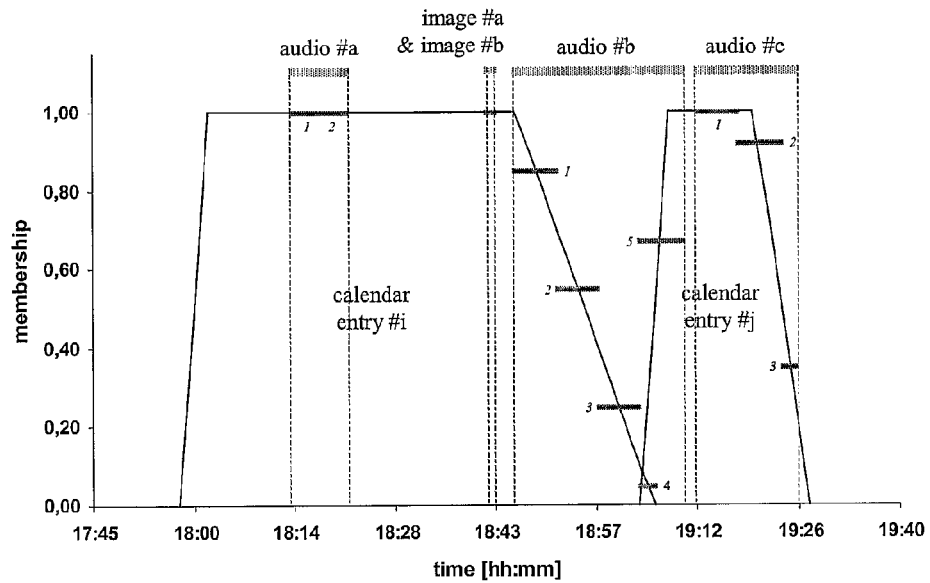
FIG. 3d shows a plot diagram illustrating example membership function plots corresponding to the calendar entries depicted in FIG. 3a and several timestamps of different individual multimedia data according to an embodiment of the invention.
Figure 3E:
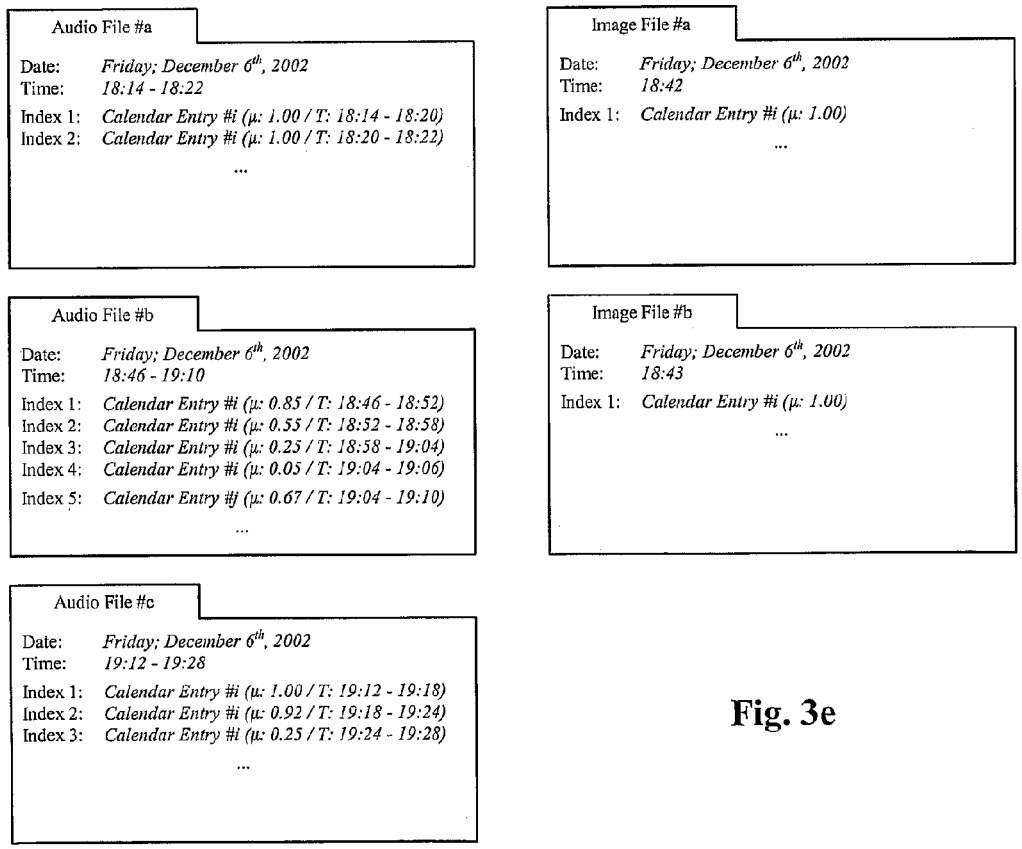
FIG. 3e shows a depiction of context information of a selection of individual multimedia data including labeling/indexing information in accordance with the calendar entries depicted in FIG. 3a and obtained in accordance with an embodiment of the present invention.

FIG. 3d illustrates example membership function plots corresponding to the calendar entries depicted in FIG. 3a and several timestamps of different individual multimedia data according to an embodiment of the invention. FIG. 3e shows a depiction of context information of a selection of individual multimedia data including indexing information in accordance with the calendar entries depicted in FIG. 3a and obtained in accordance with an embodiment of the present invention. The FIG. 3d and FIG. 3e relates to the same individual multimedia data and are described below.

The plot diagram referred to in FIG. 3d contains membership functions for the example calendar entry #i and the example calendar entry #j which are both extended by certain different overheads in time. As aforementioned the period of time defined in calendar entry #i extends from. 6:00 pm to 7:00 pm, whereas the corresponding associated extended timeframe extends from 5:58 pm to 7:06 pm. Analogously, the period of time defined in calendar entry #j extends from 7:10 pm to 7:25 pm, whereas the corresponding associated extended timeframe extends from 7:04 pm to 7:28 pm. Both the membership function associated to calendar entry #i and the membership function associated to calendar entry #j are sectionalized linear membership functions. The membership function #i rises from 5:58 pm to 6:02 pm (from membership grade zero to membership grade one) and drops from 6:46 pm to 7:06 pm (from membership grade one to membership grade zero), respectively, whereas the period of time between is constant (membership grade one). The membership function #j rises from 7:04 pm to 7:08 pm (from membership grade zero to membership grade one) and drops from 7:20 pm to 7:28 pm (from membership grade one to membership grade zero), respectively, whereas the period of time between is constant (membership grade one). The membership function #i and membership function #j differs in their shape concerning the dropping period. In this example, the shape of the membership functions may depend on the length of the timeframe.

Additionally, the periods of time relating to the periods of time of recording an audio multimedia data #a, an audio multimedia data #b and an audio multimedia data #c are schematically depicted above the membership functions as gray colored horizontal bars. Further, the moments of time relating to the moments of time of taking an image multimedia data #a and an image multimedia data #b is schematically depicted above the membership functions as gray colored dots. The respective exact periods of time of the audio multimedia data #a, the audio multimedia data #b and the audio multimedia data #c as well as the moments of time of the image multimedia data #a and the image multimedia data #b can be seen in the respective context information illustrated in. FIG. 3e.

The audio multimedia data #a is recorded within the period of time extending from 6:14 pm to 6:22 pm. In accordance with the above described method for generating labeling information the period of time of the audio multimedia data #a matches with the (extended) timeframe of calendar entry #i and the audio multimedia data #a is partitioned into two parts in accordance with a partitioning time value of 6 minutes, the first part extending from 6:14 pm to 6:20 pm whereas the second part extending from 6:20 pm to 6:22 pm. The first as well as the second part are within the extended timeframe of calendar entry #i such that both parts of the audio multimedia data #a are labeled/indexed with the calendar entry #i (depicted herein) or information obtained from the calendar entry #i (not depicted herein), respectively. The membership grades of both parts are determined as $\mu=1.0$. The parts (indicated by indices 1 and 2) are illustrated additionally in the plot diagram shown in FIG. 3d as black colored horizontal bars in accordance with their respective membership grades and in correspondence with their partitioned periods of time.

The audio multimedia data #b is recorded within the period of time extending from 6:46 pm to 7:10 pm. In accordance with the above described method for generating labeling information the period of time of the audio multimedia data #b matches with the (extended) timeframe of calendar entry #i and with the (extended) timeframe of calendar entry #j. Correspondingly, labeling/indexing is performed with respect to both the calendar entry #1 as well as the calendar entry #j.

In a first section the labeling/indexing in reference to calendar entry #i will be described. The period of time of the audio multimedia data #b matches with but do not fit to the (extended) timeframe of calendar entry #i such that audio multimedia data #b is sectioned and the fitting audio multimedia data #b section extending from 6:46 pm to 7:06 pm will be further processed. The fitting audio multimedia data #b section is partitioned into four parts in accordance with a partitioning time value of 6 minutes, the first part extending from 6:46 pm to 6:52 pm, the second part extending from 6:52 pm to 6:58 pm, the third part extending from 6:58 pm to 7:04 pm whereas the fourth part extending from 7:04 pm to 7:06 pm.

The first to fourth parts are within the extended timeframe of calendar entry #i such that these parts of the audio multimedia data #b section are labeled/indexed with the calendar entry #i (depicted herein) or information obtained from the calendar entry #i (not depicted herein), respectively. The membership grade of first part is determined as $\mu=0.85$ which represents an average membership grade obtained over the period of time relating to the first part in conjunction with the shape of the membership function in this period of time. Analogously, the membership grade of second part is determined as $\mu=0.55$, the membership grade of third part is determined as $\mu=0.25$ and the membership grade of fourth part is determined as $\mu=0.05$, respectively. The parts (indicated by indices 1, 2, 3 and 4) are illustrated additionally in the plot diagram shown in FIG. 3d as black colored horizontal bars in accordance with their respective membership grades and in correspondence with their partitioned periods of time.

In a second section the labeling/indexing in reference to calendar entry #j will be described. The period of time of the audio multimedia data #b matches with but do not fit to the (extended) timeframe of calendar entry #j such that audio multimedia data #b is sectioned and the fitting audio multimedia data #b section extending from 7:04 pm to 7:10 pm will be further processed. The fitting audio multimedia data #b section is not partitioned any more since the period of time of remaining section corresponds to the partitioning time value.

The section/part is within the extended timeframe of calendar entry #j such that this section/part of the audio multimedia data #b is labeled/indexed with the calendar entry #j (depicted herein) or information obtained from the calendar entry #j (not depicted herein), respectively. The membership grade of section/part is determined as $\mu=0.67$ The part (indicated by index 5) is illustrated additionally in the plot diagram shown in FIG. 3d as black colored horizontal bars in accordance with its respective membership grade and in correspondence with its period of time.

The membership grade within a certain period of time may be obtained from the membership function in different way. The above presented way relates to an averaging process of membership grade values within that certain period of time. Alternatively, the membership grade may be obtained by extracting a maximum or a minimal membership grade value existing within that certain period of time, respectively. Further mathematical method for obtaining sensitive membership grades are possible and applicable.

The audio multimedia data #c is recorded within the period of time extending from 7:12 pm to 7:28 pm. In accordance with the above described method for generating labeling information the period of time of the audio multimedia data #c matches with the (extended) timeframe of calendar entry #j and the audio multimedia data #c is partitioned into three parts in accordance with the partitioning time value, the first part extending from 7:12 pm to 7:18 pm, the second part extending from 7:18 pm to 7:24 pm whereas the third part extending from 7:24 pm to 7:28 pm. The first, second as well as the third part are within the extended timeframe of calendar entry #j such that the three parts of the audio multimedia data #c are labeled/indexed with the calendar entry #j (depicted herein) or information obtained from the calendar entry #j (not depicted herein), respectively. The membership grade of the first part is determined as $\mu=1.0$, the membership grade of the second part is determined as $\mu=0.92$ and the membership grade of the third part is determined as $\mu=0.25$, respectively. The parts (indicated by indices 1, 2 and 3) are illustrated additionally in the plot diagram shown in FIG. 3d as black colored horizontal bars in accordance with their respective membership grades and in correspondence with their partitioned periods of time.

The image multimedia data #a and image multimedia data #b are taken at 6:42 pm and 18:43 pm where both moments of time are within the (extended) timeframe of calendar entry #1. In accordance with the above described method for generating labeling information the image multimedia data #a and image multimedia data #b are labeled/indexed with the calendar entry #i (depicted herein) or information obtained from the calendar entry #i (not depicted herein), respectively. The membership grades of the image multimedia data #a as well as the image multimedia data #13 are determined as $\mu=1.0$. The image multimedia data #a and the image multimedia data #b are illustrated additionally in the plot diagram shown in FIG. 3d as black colored dots in accordance with their respective membership grades and in correspondence with their moments of time.

The above described method as been embodied to attribute multimedia information with calendar entry information being based on a timestamp comparison operation. Further context and sensor information may be included in the labeling operation of multimedia information. One possible additional information of interest for attributing multimedia information is a location information in form of geographical position information or in form of mapped location information. Existing devices, like GPS devices or mobile communication terminal device implementing positioning services, provide for data on location information of the devices. Based on the timestamps both of the location/position information and the multimedia information location/position information can be attributed to multimedia information.

Location/position information as provided for e.g. by GPS components may not be sufficient in some cases; in contrast the resolution of positioning information as provided for by a calendar entry information is only depending on the indications of the user (street number, floor number, room number, etc.). In case both kinds of information, i.e. location/position information such as GPS data and location as part of a calendar entry, are available, the one should be selected that provides for the better precision. At the same time, the other data can be used in order to validate the used location/position information. The location/position information obtain for example from a GPS component could even be used in order to validate a complete calendar entry and/or to contribute to the membership grade determined in conjunction with the calendar entry.

The labeling of personal multimedia information by means of personal calendar entries provides for a highly reliable approach towards the labeling/indexing and subsequent retrieval of multimedia information. In contrast to content analysis method of multimedia information this inventive approach provides for a better recall and also for a better precision. Further, this gain in retrieval quality is reached with almost no additional costs including both any kind of required efforts from the side of the user and computational costs.

The presented method for extracting meta-information being used for retrieval of information associates a huge amount of meta-information with any user provided information (multimedia information). Each user provided information overlapping in time with each calendar entry is provided with meta-information for retrieval provided by the information comprised in the each calendar entry. That means for example relating to a name field comprising information about persons being members of a meeting, user provided information, e.g. recorded dictation, images, downloaded information such as documents and the like, is associated with each name of the meeting members such that a retrieval in accordance with one of the name of the meeting members results in a list of retrieval results comprising at least those information parts which have been provided by the user of the electronic device during the meeting.

Moreover, the aforementioned method describes in detail to obtain a membership grade value which serves as a measure for evaluating a retrieval. Such a measure is useful in view of a huge amount of retrieval results for sorting and/or filtering the retrieval results providing a reliable processing of the retrieval results. A pre-defined or user-defined membership grade threshold may be defined and only retrieval results are presented to a user on a retrieval instruction in case the membership grade values defined for each retrieval results exceed the defined membership grade threshold which enables to find the intended retrieval result easier since the number of retrieval results is limited therewith.

Additionally, the membership grade values are suitable for sorting multiple retrieval results for example in a value dropping sequence. The user may start a manually selecting of relevant retrieval results beginning with those retrieval results which have the highest membership grade values.

Associating Context Information to Multimedia Information

As aforementioned in view of multimedia information being associated with information extracted from an electronic calendar and from its calendar entries the following embodiment will address the associating of context information to audio (multimedia) information. Here, the context information is to be understood as any information selected and indicated by a user to be associated to the audio information.

More particularly, a most natural human method to express and formulate human ideas and to exchange views is to express and formulate them linguistically. Common dictation machines take account of this natural human behavior but conventionally, dictation machines are limited to a kind of serial operation mode only allowing to record speech/voice information. Analogously to the above discussed disadvantages of current multimedia information (data), comparably, such audio information are also subjected to the problem that information retrieval systems may not have enough interpretable information about the content of the audio information to allow reliable retrieval and provide a useful results thereof. Additionally, serial audio recording of human ideas and views is indeed a most natural process therefor but it is advantageous in view of the expressing of ideas and view as well as in-regard to ideas and views to associate accompanying context information to the audio information, which may be any sensor information, any information allowing a reliable labeling/indexing of the audio information, any information amplifying or completing the audio information such as images, sketches, video sequences and the like.

In the following such an enhanced audio dictation apparatus will be presented allowing to associate any type of further information to a recorded audio information.

Figure 4A:
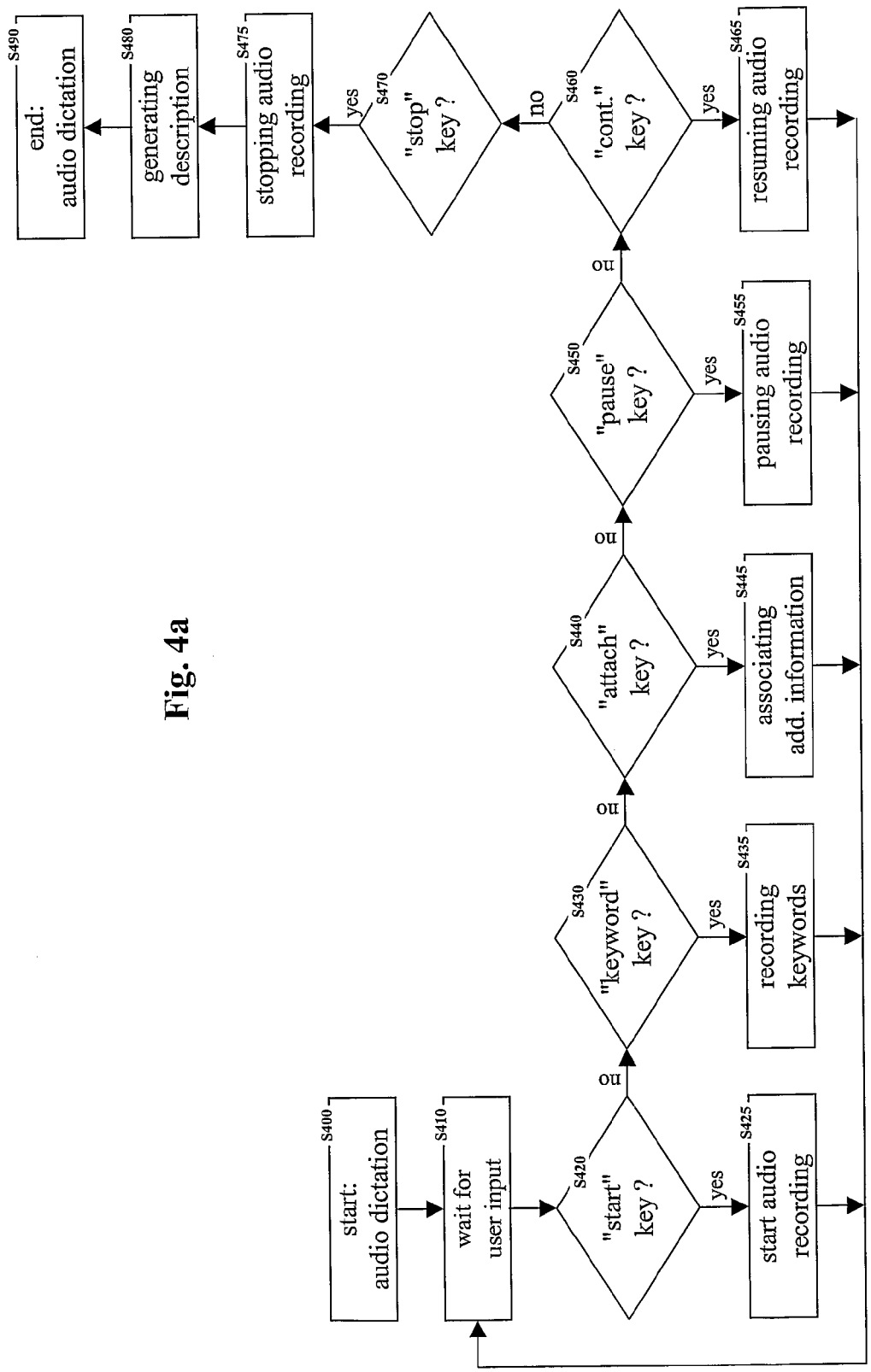
FIG. 4a shows a flow chart depicting an operational sequence for recording audio information and for associating additional information of any type to the audio information according to an embodiment of the invention.

FIG. 4a illustrates an operational sequence for recording audio information and associating additional information of any type to the recorded audio information according to an embodiment of the invention.

The operational sequence for recording audio information may be operated by an adequate apparatus or device at least being equipped with an audio sensor such as a microphone for sensing audio signals, an audio recording component for recording either analog audio signals or a digitized audio information being obtained by an analog-to-digital converter which is supplied with the analog audio signals, a recording storage again either suitable to receive and store analog audio signals or digitized audio information, and means for controlling the recording operation such as specific keys, a keypad or a keyboard. More particularly, the apparatus or device may comprise additionally an audio reproducer such as a speaker for reproducing the recorded audio information.

In case of digitizing the sensed audio signals, the audio recording component may further include an audio compressing component for compressing digital audio information of the analog-to-digital converter and for decompressing the compressed digital audio information to be supplied to a digital-to-analog converter for being reproduced. The recording storage may be any storage device and/or medium capable to store and provide digital information. Conventionally, memory, magnetic disk storage, removable storage medium devices are mass storage systems connected via a wired or wireless communication network are used for storing digital information.

In view of associating additional information of any type to a recorded audio information and particular multimedia information the apparatus or device implementing audio recording capability should further have the capability to generate, retrieve, receive, process or the like the additional information.

In view of the following description of the operational sequence, it shall be assumed that the operational sequence is operated by a. mobile terminal and more particular by a mobile communication terminal having audio recording and reproducing capability and being able to handle information such as multimedia information. More precisely, a personal digital assistant (PDA) or an enhanced mobile communication device having any multimedia capability.

In the operation S400, the operational sequence for associating additional information of any type to an audio recording is started.

In the operation S410, a user input is awaited for and on a trigger signal caused by a user input 5 for example by user operating of any dedicated keys a corresponding key selection signal is received for being evaluated.

In the operation S420, it is checked whether a "start" key has been operated by the user. In case the "start" key has been operated the operation sequence continues with an operation S425, otherwise the operational sequence continues with an operation S430.

In the operation S425, the audio recording is started. In accordance to a digital processing terminal, the sensed audio signals are converted into an audio (information) stream representing the digital audio information. The digital audio information may represent compressed digital audio information in accordance resulting from applying any audio compression codec of state of the art. The audio stream obtained during the recording of audio signals is continuously stored in a digital storage, e.g. in a memory or in a mass storage such as a removable magnetic or optical medium storage. In view of the amount of storage capacity required for digital audio information and/or with regard to a legal request for permanently storing the digital audio information, a storage employing removable magnetic or optical medium may be recommended for storing the audio stream.

The audio signal recording having been started by the user with operating the "start" key may be operated continuously until a dedicated stopping or pausing of the audio signal recording is instructed by the user.

In the operation S430, it is checked whether a "keyword" key has been operated by the user. In case the "keyword" key has been operated the operation sequence continues with an operation S435, otherwise the operational sequence continues with an operation S440.

In the operation S435, keywords are recorded. The recording of keywords may be operated in parallel to the audio signal recording. That is, the resulting audio stream from the audio signal recording may be—either split into two different audio (information) streams, one being the aforementioned audio (information) stream and the other being an audio keyword (information) stream such that it is possible to store both audio streams separately, for example one on a removable storage medium being coupled to the device having audio recording capability the and the other in the memory of the device having audio recording capability.

Alternatively, the aforementioned audio (information) stream relating to the continuous audio recording may be paused such that the sensed audio signals are only converted into the audio keyword (information) stream for being stored separately from the aforementioned audio (information) stream.

In the operation S440, it is checked whether an "attach" key has been operated by the user. In case the "attach" key has been operated the operation sequence continues with an operation S445, otherwise the operational sequence continues with an operation S450.

In the operation S446, the attaching command a user to associate additional information of any type to the audio information being currently under recording where the audio signal recording may be continuously operated or may be interrupted. Particularly, the user may obtain any additional information of any type to be associated to the recorded audio information. The obtaining of that further information may be performed by any procedure provided for by the used device. For example, the recording device may have implemented a digital camera which allows to take images or video sequences. These taken images and/or video sequences may amplifying the audio information with regard to its intellectual content. Analogously, information to be associated to the recorded audio information may be obtained via a wired or wireless communication interface from an information servicing entity or may be retrieved from the memory of the device or from a storage medium coupled to the device. The possibility to obtain additional information to be associated to the recorded audio information are not limited to the aforementioned procedures but depend on the capabilities of the device having embedded to the audio signal recording capability. Those known in the art may replenish the provided list of procedures since the kind of obtaining the additional information is out of the scope of the present invention.

In the operation S450, it is checked whether a "pause" key has been operated by the user. In case the "pause" key has been operated the operation sequence continues with an operation S455, otherwise the operational sequence continues with an operation S460.

In the operation S455, the recording of audio signals is paused. The audio signal recording may be resumed on instruction of the user.

In the operation S460, it is checked whether a "continue" ("cont.") key has been operated by the user. In case the "continue" key has been operated the operation sequence continues with an operation S465, otherwise the operational sequence continues with an operation S470.

In the operation 5465, the recording of audio signals is continued. The continuing of the audio signal recording allows a user to resume the audio signal recording after having instructed to pause the audio signal recording (compare with operation S450 and operation S455).

In the operation S470, it is checked whether a "stop" key has been operated by the user. In case the "stop" key has been operated the operation sequence continues with an operation S475, otherwise any further operation may be operated (not shown).

In the operation S475, the audio signal recording is stop completely. The audio information resulting from the continuous audio stream is complete.

In the operation S480, context information during the audio signal recording are accumulated in an associated audio context information. Additionally to the audio information each activity having been performed during the audio signal recording by the user has been logged such that a complete protocol/description can be generated therefrom. Especially context information relating directly to the audio signal recording are included into the protocol, that is, e.g. timestamp information relating to starting/stopping of the audio recording; keyword recording operation, pausing/resuming operation, linking information relating to address information where to retrieve the audio information resulting from the audio (information) stream, the audio information resulting from the keyword audio (information) stream and/or additional information of any type being instructed by the user to be associated with the audio information or audio recording event. But also more common context information can be added to the protocol/description like identification of the recording device, of the speaker, of the employed storage (e.g. identification of the storage medium), location/position information relating to the place of recording and more.

A possible realization of such a protocol/description will be described with reference to FIG. 4c.

In the operation S490, the method for associating additional information of any type to an audio recording is completed.

The operation of the audio signal recording has been described in view of dedicated keys operable with a user for instruction the described operations/commands Such commands for controlling the audio signal recording may be also generated by operating keys having multiple assignments or by a textual or graphical menu offering items corresponding to audio signal recording functions for being selected by the user.

FIG. 4b shows a sequence of operations in time illustrating an example usage sequence according to an embodiment of the invention. The operations in time may be seen as a dictation of a user summarizing the results of a meeting.

In a first operation the user starts the audio signal recording for dictating the summary for later usage or for later remembering. On indication of the user to start audio signal recording (the user may select the key "start") the mobile terminal having audio recording capability starts recording to receiving audio stream to a removable storage medium (magnetic disk, optical disk, memory card etc) coupled to the mobile terminal device via a respective storage medium interface (drive, interface etc). A designation of the may be defined manually by the user or automatically by the recording component to be assigned to the audio information for later retrieval. Herein, the resulting audio information is provided with the designation "AUDIO1". The starting time (timestamp) of the audio recording is stored for example in the memory of the device or in a memory assigned to the audio recording component which is responsible for the audio signal recording.

The user dictates text to the mobile terminal which is sensed by an audio sensor, converted into a digital audio stream and stored accordingly.

The user indicates that keywords should be recorded and correspondingly, pushes and holds the "keyword" key. On this indication of the user, the audio signal recording of one or more keywords is initiated. As aforementioned, the audio signal recording of keywords is stored separately to the audio information dictated before and the audio recording operation initiated before is either continued or paused during the recording of the one or more keywords. The starting time of the keyword recording is stored.

With releasing of the "keyword" key the user indicates that the keyword recording has been completed and the recording of the dictation is continued. The stopping time of the keyword may be stored.

The user instructs subsequently to pause the audio recording by selecting a dedicated "pause" key. The recording of the audio signals is paused accordingly. The starting time of the initiated pause is stored. Now the user may user other function or other applications provided for by the mobile terminal. Herein, the user takes an image with a digital camera coupled in any way to the mobile terminal for image data transmission or built in the mobile terminal. The user indicates that this image is to be associated with (attached to) the recorded audio information for example by operating a dedicated "attach" key. In view of the example relating to a meeting the picture may be taken from a sketch board to amplify the dictation. The taken image is stored (here in the memory or any other available storage area) and a manually or automatically defined designation (herein "IMAGE1") is assigned to the image which enable to retrieve the image later. The time of attaching of the image to the audio information is stored.

Subsequently, the user resumes the audio signal recording by operating the "continue" key. The resuming time is stored. The user carries on dictating information.

Finally, the audio signal recording is finished on user instruction or on operation of the "stop" key by the user, respectively. The stopping time of the audio recording is stored.

After the user indication of finishing the audio signal recording the mobile terminal may evacuate information stored in a non-permanent storage up to now to a permanent storage if available. The protocol/description is generated in accordance with the above described user and terminal operations. A corresponding example description which may be obtained is shown the following FIG. 4c.

Assuming that the mobile terminal with the audio recording capability supports a file system comparable to that known from traditional computer following files may have been generated after the stopping of the audio recording:

AUDIO1,
KEYWORDS_AUDIo1,
IMAGE1, and
DESCRIPTION1;

where the file "AUDIO1" contains the digitized audio information of the dictation, the file "KEYWORDS_AUDIO1" contains the digitized audio information of the dictated keywords, the file "IMAGE1" contains the picture taken during the dictation and the file "DESCRIPTION1" contains the description/protocol to the audio recording. The storage places of the resulting files is arbitrary but the files should be accessible for reproducing on user. demands. An example coding and organization of the file "DESCRIPTION1" is depicted in FIG. 4c.

FIG. 4c shows a possible example description in view of the example usage sequence presented in FIG. 4b and according to an embodiment of the invention. The description/protocol of the audio recording may be coded as an extended markup language (XML) coded description/protocol. A corresponding document type description (DID) defines the structure and elements of the XML-coded description and ensures a unique parsing of the description.

The example file "DESCRIPTION1" shown in FIG. 4c comprises a header section (lines 1 to 3) which includes information about the storage medium/storage device where at least the recorded audio information "AUDIO1" is stored, information about the recording device and information about the time at which the audio recording as be taken place or at which the audio information has been finally stored. Further information may be included in the header section such as an identification information about the user how has dictated the audio information and the like.

The protocol information is coded in a body section herein extending from line 6 to line 29. In a first subsection of the body a start time and a stop time are defined. The start time is defined to be TIME1 and the stop time is defined to be TIME5. In accordance with the usage operation described in detail with reference to FIG. 4b this time information has been stored at starting and at stopping of the audio signal recording. Additionally, an address information to the recorded audio information is coded. The address information may be coded in accordance to the employed data storage system such as a directory/file address information or more commonly a uniform resource locator (URL) or uniform resource indicator (URI). Alternatively, the audio information may be embedded directly into the subsection.

A next subsection of the body includes information relating to the keywords. Herein, a moment of time relating to the recording of the keywords is coded as TIME2. Additionally, an addressing information to the keyword audio information is coded.

In the next subsection of the body the pause operations is coded. According to the above presented example a pause has been initiate at the moment of time TIME3 and the recording has been resumed at the moment of time TIME4.

A further subsection of the body includes information about associated information, herein designated as embedded objects. The moment of time TIME3 is coded in the subsection at which the additional information has been associated to the recorded audio information and address information about the information (object) is coded in the subsection in order to allow access of the user to this associated information.

Following subsections of the body includes further context information. Herein location/position information and other information relating to additional sensors are coded such as sensor information obtained from and ambient light sensor, acceleration sensor(s), background audio signals and background audio signal analysis results and the like.

The detailed XML-coded description/protocol with reference to FIG. 4c is one possibility to perform a logging of context information during the audio signal recording. Another possibility of logging context information is described with respect to the personal logbook mentioned above.

Translated into the wording which has been used in conjunction with the detailed description of the personal logbook the recorded audio information as well as user commands concerning the operation of the audio signal recording may be logged as user input information. Further information relating to the associating of information to the recorded dictation may be provided to the personal logbook as context information. In this case the labeling and/or indexing of the audio information (which represents user input information) results in the same interdependency structure such as described in view of the following audio information description/protocol referred to in FIG. 4c and with regard to the following graphical depiction referred to in FIG. 4d and FIG. 4e.

Speech/voice recognition systems/applications are improving and will gain significance in the nearer future since the capability to convert information provided by speech/voice input into text based information is time saving. Besides the pure text based information obtained from information provided by speech/voice input the original audio recording will be preserved to check the speech recognition (translation) at any time. Such a speech/voice recognition may be employed for the recorded audio information where the recognition may be operated in the recording device or by a speech recognition service provided by any external entity accessible via a communication network, in particular via a mobile communication network in case of mobile recording terminal. The resulting text based information resulting from a speech/voice recognition can be included directly into the description/protocol information of the audio recording or address information for retrieving the text based information may be included. The speech/voice recognition may be employed to the dictation and/or to the keyword dictation.

A retrieval system allowing a user to retrieve certain audio information in accordance with request information may employ the audio keyword recording by matching request information inputted by audio recording with the previously recorded audio keywords being recorded during the dictation of the audio information. Moreover, in case of using speech/voice recognition, the keywords may be available as text based keywords. In this case, the retrieval may be also based on text comparison of text information included the retrieval request. Further information being included in the description/protocol of the recording may be employed for retrieval by using that information for labeling/indexing the audio recording as aforementioned.

The protocol/description information may be employed to create a graphical depiction of the logged information for providing a flexible mind-map supporting recognition and retrieval of information. The following FIG. 4d and FIG. 4e both illustrate example mind-maps, where the mind-map depicted in FIG. 4d relates to a graphical user interface and the mind-map depicted in FIG. 4e relates to textual oriented user interface.

Figures 4D, 4E:
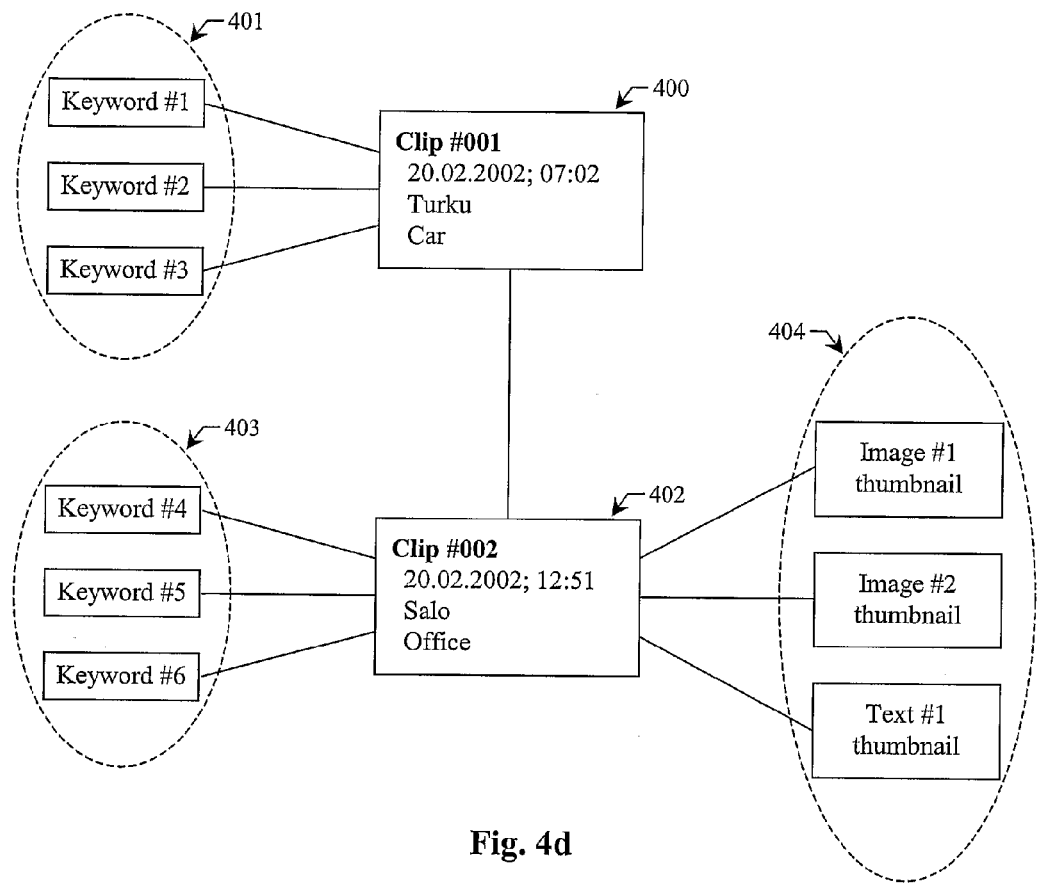
FIG. 4d shows a block diagram illustrating graphically a depiction of a protocol/description information according to an embodiment of the invention.
FIG. 4e shows a table depicting a textual oriented depiction of a protocol/description information according to an embodiment of the invention.

FIG. 4d illustrates graphically a depiction of a protocol/description information according to an embodiment of the invention. The graphical depiction may comprise only an extraction of information available with the audio information. The graphical depiction shows a first graphical representation of a recorded audio information object 402 being denoted as (audio) clip #002. Further the graphical depiction of the audio information object 402 includes information about the recording date/time and the place of recording. A plurality of further graphical representations are arranged around the depicted audio information object 402. Lines linking the graphical representations shall represent interdependencies such as associations. A set of graphical representations 403 relates to keywords, keyword object #4, keyword object #5 and keyword object #6. The linking lines connecting the graphical representations of each of the keyword objects #4, #5 and #6 with the audio information object 402 indicates the belonging of those keyword objects #4 to #6 to this audio information object 402. Further, a set of graphical representations 404 is depicted and each of the graphical representations is linked by a connecting line to the audio information object 402. Correspondingly, the linking lines indicate that the image object #1, the image object #2 and the text object #1 is associated with the audio information object 402 and audio clip #002, respectively.

Analogously, the graphical depiction shows a second graphical representation of a recorded audio information object 400 being denoted as (audio) clip #001 and the audio information object 400 has associated keyword objects #1, #2 and #3 shown as a set of graphical representations 401 each of which is connected via a line with the audio information object 400.

The graphical depiction may not only be used for supporting the mind but the graphical depiction may be operated as a graphical user interface. For example, the user may select one of the graphical representations in order to retrieve the respective indicated information. That is, in case the user selects a keyword object the mobile terminal reproduces the recorded digital audio sequence. Analogously, in case the user selects audio clip #002 the corresponding dictation is reproduced, in case the user selects one of the graphical representations of the image objects an image viewer application shows the corresponding image to the user and in case the user selects the graphical representation of the text object a text viewer application shows the corresponding text to the user.

FIG. 4e illustrates a textual oriented depiction of a protocol/description information according to 5 an embodiment of the invention. This textual oriented depiction is an alternative depiction showing the same properties and information to the user as described with reference to FIG. 4d.

The logged attributes of the recorded audio information objects audio clip #001 and audio clip #002 are presented in a table depiction. The table depiction includes the elements clip designation, date and time of recording, place of recording, and address information of the associated information, associated text objects, associated keyword objects and associated image objects. The tabular depiction allows a clear overview of the information/objects which have been associated by user instructions to the respective audio information.

Analogously, a selecting of an address information entry in the depicted table result in reproducing/illustrating of the respective selected information in accordance with the type of the information (object).

IV. Watermarking/Embedding Information into Audio Data Sequences

The aforementioned methods relating to a reliable retrieval and to sensitive retrieval results require additional information containing labeling and/or indexing information. That is, the single information in reference to which the retrieval, labeling and/or indexing by accompanying meta-information is described is of limited usefulness. Therefore, it is advantageous to offer a method for embedding or appending at least a limited amount of meta-information directly into/to information and more particularly directly into audio information.

The inventive concept for appending and/or embedding information to/into an audio information sequence provides several advantages besides the mentioned possibility to complete the audio information sequence with labeling and/or indexing information.

The inventive concept further relates to a method for embedding information of any type into an audio sequence which ensures that the embedded information is prevented independently from converting and transcoding of the audio sequence. That is, the embedded information is preserved in the audio sequence although the audio sequence is converted from an analog encoded audio sequence to a digital encoded audio sequence and vice versa, from a digital encoded audio sequence to an analog encoded audio sequence. Further, the embedded information is preserved in the audio sequence although the audio sequence is transcoded from an audio sequence being encoded in a first digital audio format comprising any audio compression formats, into an audio sequence being encoded in a second digital audio format.

Besides the possibility to embed information of any type relating to context information, meta-information and the like into an audio sequence, the capability to embed information according to an embodiment of the invention. may be employed to embed authentication and/or watermarking information which may be also encrypted.

The inventive concept to addend and/or to embed information to/into audio information sequences is based on ari octave-based coding method which allows coding of characters representing the appended or embedded information. A well known character encoding is the ASCII 0 encoding assigning uniquely a sequence of 7 or 8 bits to one character/symbol resulting in code tables assigning uniquely each of the bit sequences with a length of either 7 bits or 8 bits to one characters/symbols, respectively. Depending on the appended or embedded information to be coded the total number of characters/symbols which are required may differ such that related coding tables may be employed. In the following, a bit sequence of the length 6 bits. will be employed to described to inventive method, where this bit sequence allows to code 64 different characters/symbols. Such a code table comprising 64 different elements should be suitable to code HTML (hypertext markup language) tags, URL (uniform resource locator) sequences, URL (uniform resource indicator) sequences and the like, for the coding of which the numbers 0-9, characters A-Z (26 letters) and a few specific symbols ( )/:\.#,@_ are sufficient.

Each character/symbol is coded by a unique combination of tones which is repeated over more 25 than one order (octave). For example relating to the musical scale comprising the tones C, D, E, F, G, A and H such a coding could be expressed by

"1"={C,E,A};
"2"={D,E,11};
"3"={C,F,H};

where three different tones are employed for each tone basis forming a code. As aforementioned codes are repeated over all the octaves that are within a sensitivity range of the audio system, i.e. the frequency range used for-audio processing/recording.

Figure 5A:
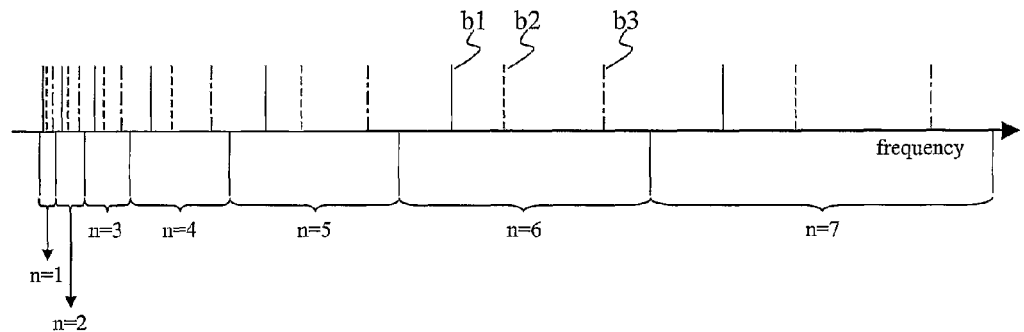
FIG. 5a shows a plot diagram illustrating an example frequency range of an audio recording/reproducing system including several complete octaves.

FIG. 5a illustrates a frequency range of an audio recording/reproducing system including several complete octaves. An index n is shows in the frequency range illustrating for enumerating the depicted octaves ranging from 1 to 7 corresponding to the seven octaves subsequent in frequency. The three frequencies indicated by the numerals b1, b2 and b3 in the octave n=6 relate to a specific code basis of a certain character/symbol employing three different tones. Correspondingly to the aforementioned repetition over all octaves, corresponding frequencies in each other octave (1, 2, 3, 4, 5 and 7) are indicated which relate to the originally indicated frequencies b1, b2 and b3.

In the more general case, the code basis for a given character x is given by a distinct sequence of a pre-defined number of tones which can be expressed as $\{b_j(x)\}=\{b_1(x), b_2(x), \ldots\}$, where the index j relates to the number of tones being employed, $j=1, 2, \ldots, j_{max}$.

There are numerous ways to create the code basis. In one embodiment according to the invention, the code basis is orthogonal i.e. the code bases of the characters/symbols have no correlation. According to another embodiment of the invention, the code bases are partly overlapping, i.e. are partly correlated, which takes account of the fact that audio signals should be able to withstand high noise.

Figure 5B:
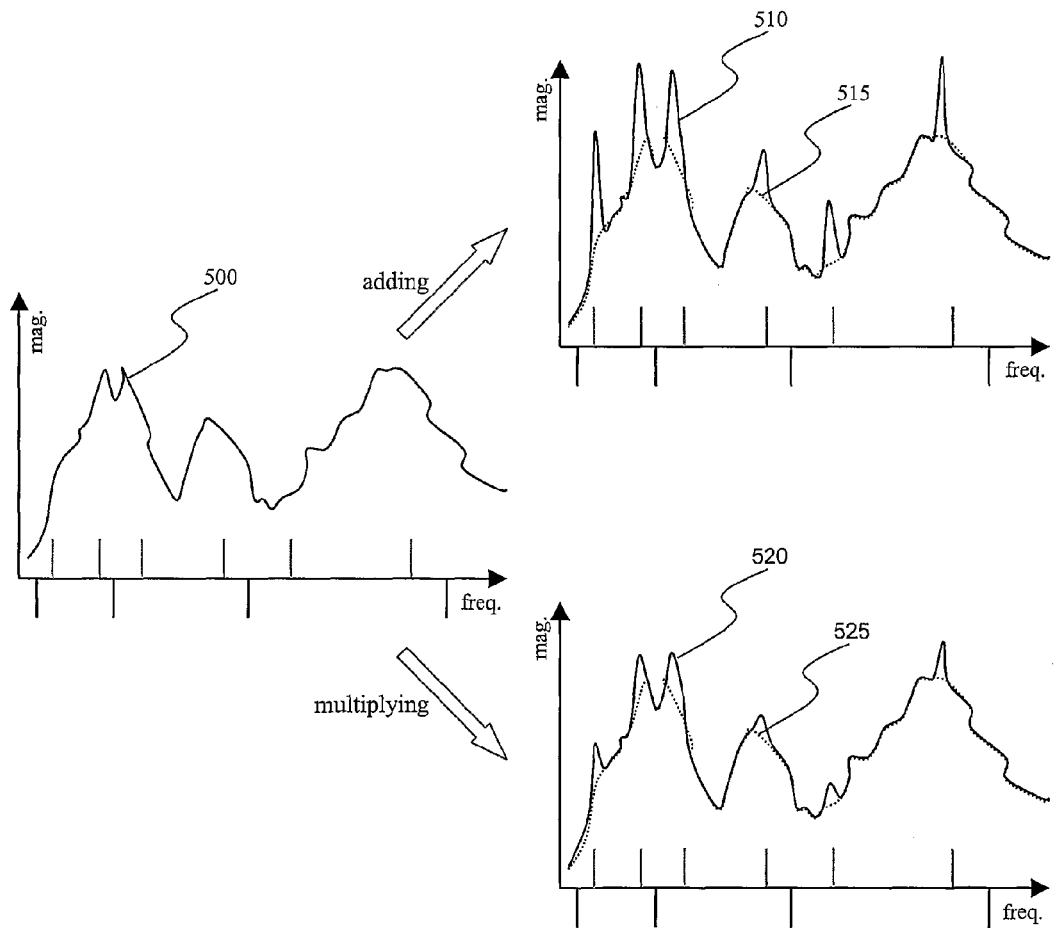
FIG. 5b shows a set of plot diagram depicting different coding methods according to embodiment of the invention.
Figure 5C:
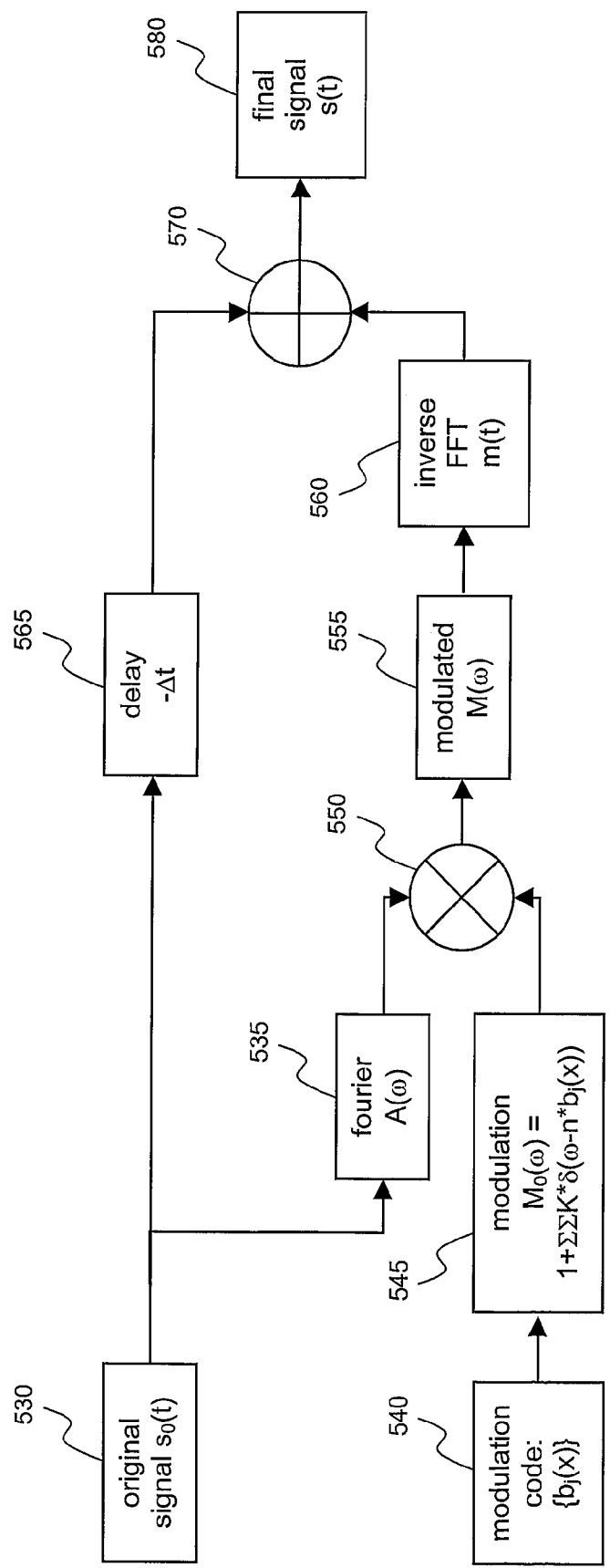
FIG. 5c shows a block diagram depicting an embedding of information into an audio signal according to an embodiment of the invention.

FIG. 5c depicts a signal flow chart illustrating a processing of an audio signal $s_0(t)$ for embedding information into that according to an embodiment of the invention.

The audio signal $s_0(t)$ 530 is assumed to be the original audio signal having no embedded information. A character/symbol x with code $\{b_j(x)\}=\{b_1(x), b_2(x), \ldots\}$ 540 ($j=1, \ldots, j_{max}$) is to be embedded into this audio signal $s_0(t)$ 530. The combining of both the audio signal $s_0(t)$ 530 and the code formulation $\{b_j(x)\}$ 540 is performed in the frequency domain of the signal and the code formulation.

Correspondingly, the audio signal $s_0(t)$ 530 is transformed into the frequency domain resulting in an audio Fourier transformation $A(\omega)$ 535 of the audio signal $s_0(t)$ 530. The code $\{b_j(x)\}$ being based on a pre-defined number of tones can be directly denoted in the frequency domain resulting in a modulation signal $M_0(\omega)$ 545 corresponding to the code $\{b_j(x)\}$ 540 and may be expressed mathematically as:

$$M_0(\omega) = 1 + \sum_n \sum_j K\delta(\omega - nb_j),$$

where the index j relates to the tones (frequencies) employed for the code of the character/symbol x, the index n relates to the frequency sections (octaves) in which the tones ($j=1, \ldots, j_{max}$) are repeated such as depicted in FIG. 5a and K is a pre-defined attenuation factor (K<1). The aforementioned given mathematical definition for expressing the modulation signal $M_0(\omega)$ 545 represents an ideal mathematical expression. In practice, delta function as presented and employed are not available such that the employed delta function is to be replaced with a suitable approximation function such as a sinc-function, a Gaussian function etc as known to those skilled in the art.

These two signals, the audio Fourier transformation $A(\omega)$ 535 as well as the modulation signal $M_0(\omega)$ 545, are to be combined in the frequency domain. According to embodiments of the invention the Fourier transformation $A(\omega)$ 535 and the modulation signal $M_0(\omega)$ 545 may be added or may be multiplied in order to obtain a suitable modulation signal $M(\omega)$, respectively.

FIG. 5b shows a set of plot diagram depicting the audio Fourier transformation $A(\omega)$ and modulation signals $M(\omega)$ resulting from the combining of the Fourier transformation $A(\omega)$ 535 and the modulation signal $M_0(\omega)$ 545 according to embodiment of the invention.

The first plot diagram illustrates a curve 500 representing the original audio signal $s_0(t)$ in the frequency domain, i.e. the audio Fourier transformation $A(\omega)$ 535. Additionally, indications above and below the abscissa of the plot diagram being the frequency axis represent both the frequency sections (octaves) in which the tones of the code are repeated and the tones of the code, respectively. Herein, three frequency sections (octaves) are depicted and the basis code comprises a set of two tones $\{b_j(x)\}=\{b_1(x), b_2(x)\}$ which is repeated within each frequency section (octave). Analogously to FIG. 5a, the frequency sections (octaves) are depicted by indication below the abscissa whereas the tones are depicted by indication above the abscissa.

A second plot diagram illustrates a curve 510 representing modulation signal $M(\omega)$ obtained from the audio Fourier transformation $A(\omega)$ and the modulation signal $M_0(\omega)$ by adding in the frequency domain: A third plot diagram illustrates a curve 520 representing modulation signal $M(\omega)$ obtained from the audio Fourier transformation $A(\omega)$ and the modulation signal $M_0(\omega)$ by multiplying in the frequency domain. Both plot diagrams further include the original audio Fourier transformation $A(\omega)$ as dotted curves 515 and 525, respectively, in order to indicate the difference produced by adding and multiplying for modulating with the modulation signal $M_0(\omega)$.

Both modulation operations, either modulating by adding or modulation by multiplying, are applicable for deriving a suitable modulation signal $M(\omega)$. According to an embodiment of the invention, the obtaining of the modulation signal $M(\omega)$ may be used since as depicted deviations in the frequency curve caused by the modulation signal $M_0(\omega)$ may be smaller such that a resulting interference in the final audio signal due to these deviations is less obvious to hear by a user. The attenuation factor K is pre-determined in such a way that code embedded in the audio signal is decodable later thereof but the interference is low.

As described with reference to FIG. 5b and with respect to the embodiment of the invention referred to in FIG. 5c, the audio Fourier transformation $A(\omega)$ 535 obtained by Fourier transformation (e.g. performed by a Fourier transformer) of the original signal $s_0(t)$ 530 and the modulation signal $M_0(\omega)$ 545 are multiplied 550 (e.g. by a multiplying component, multiplier) which results in the modulated signal $M(\omega)$. The multiplying of the audio Fourier transformation $A(\omega)$ and the modulation signal $M_0(\omega)$ 545 may be operated point-wise.

Subsequent, the resulting modulated signal $M(\omega)$ is transformed back into a modulated audio signal m(t) in the time domain e.g. by employing inverse Fourier transformation which can be operated by an inverse Fourier transformer. In case the modulated signal $M(\omega)$ in the frequency domain is a discrete signal fast Fourier transformation may be applied for transforming into the time domain.

Finally, the modulated audio signal m(t) is combined with the original audio signal $s_0(t)$. Since the above described processing operations applied to the original audio signal $s_0(t)$ for obtaining the audio signal m(t) the audio signal m(t) and the original audio signal $s_0(t)$ may be spaced in time for a certain period $-\Delta t$. A combining of the modulated audio signal m(t) and the original audio signal $s_0(t)$ without taking account of the time difference $-\Delta t$ may cause interference in the combined signals. Therefore, the original audio signal $s_0(t)$ may be delayed resulting in a delayed original audio signal $s_0(t)=s_0(t-\Delta t)$ which is coincide in time with the modulated audio signal m(t). The combined final audio signal s(t) 580 is obtained by adding the delayed original audio signal $s_0(t)=s_0(t-\Delta t)$ and the modulated audio signal m(t) (e.g. operated by an adding component, adder).

In case of a relative slow changing original audio signal s(t) and correspondingly a relatively slow changing modulated audio signal m(t) the delay in time $-\Delta t$ of the audio signal m(t) due to the preceding processing operations is small in comparison with the changes in the audio signals such that the compensation of the delay in time $-\Delta t$ is not necessary.

The embedding of a character/symbol .x in an audio signal according to an embodiment of the invention has been illustrated in detail with reference to FIG. 5c and FIG. 5b. The following FIG. 5d refers to the extracting of an embedded character/symbol from an audio signal according to an embodiment of the invention.

Figure 5D:
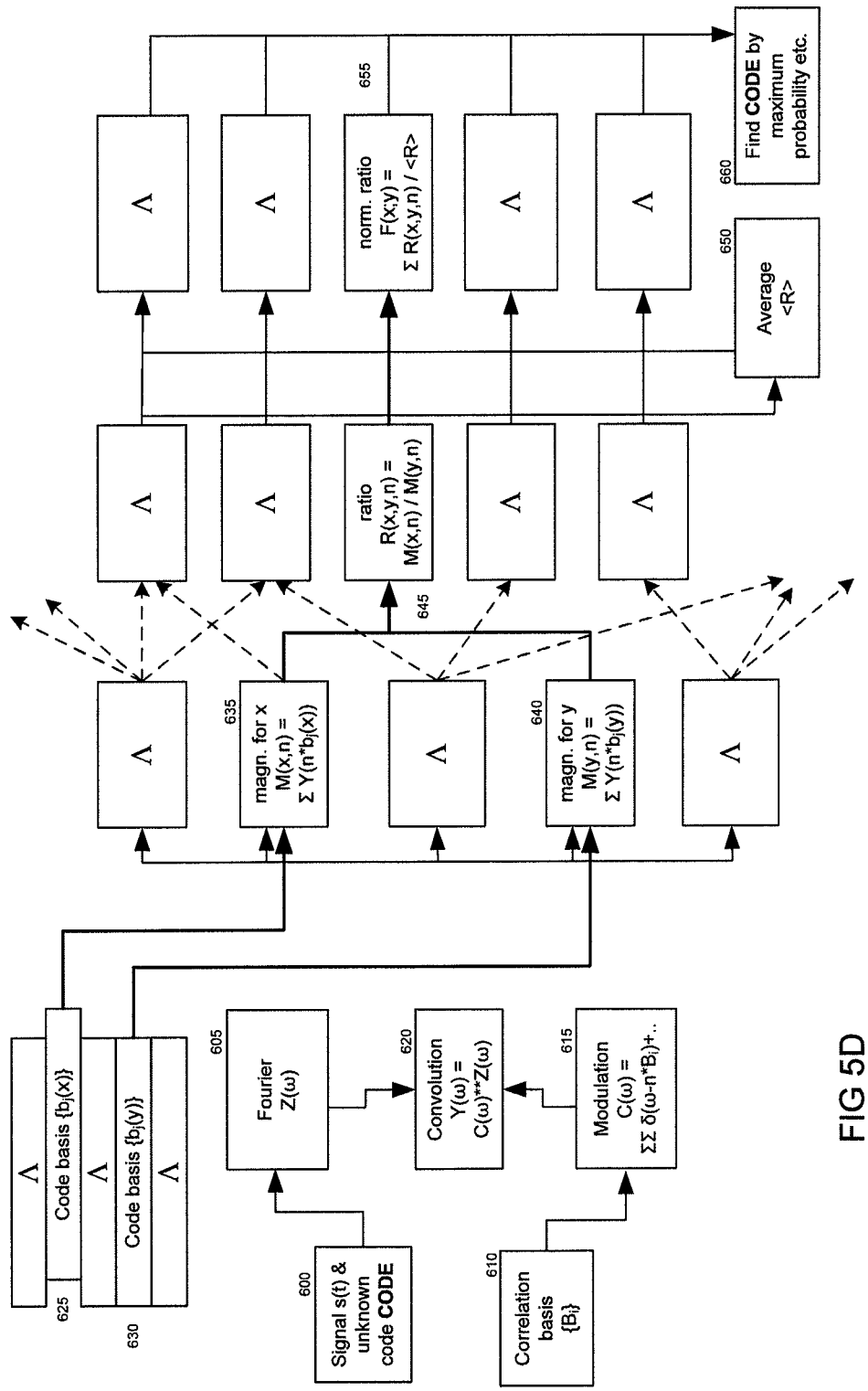
FIG. 5d shows a block diagram depicting a recovering of information being embedded in an audio signal according to an embodiment of the invention.

FIG. 5d shows a block diagram depicting a recovering of information being embedded in an audio signal according to an embodiment of the invention.

The decoding of an unknown character/symbol and an unknown character/symbol sequence requires the input of an audio signal s(t) embedding the an unknown character/symbol and an unknown character/symbol, a correlation basis $\{B_i\}$ and the code bases $\{b_j(x)\}, \{b_j(y)\}, \ldots$ of the total set of characters/symbols x, y, . . . being possibly coded in the audio signal s(t). For simplicity but without limiting thereto the code basis $\{b_j(x)\}$ corresponding to a character/symbol x and the code basis $\{b_j(x)\}$ corresponding to a character/symbol y are depicted in FIG. 5d. It is assumed that the audio signal s(t) has embedded a character/symbol $\chi$.

The audio signal s(t) 600 is transformed into the frequency domain resulting in a Fourier signal $Z(\omega)$ 605, for example by Fourier transformation.

The correlation basis $\{B_i\}$ 610 can be defined directly in the frequency domain and is represented by a set of all frequencies being used to code the characters/symbols. The modulation $C(\omega)$ 615 corresponding to the correlation basis $\{B_i\}$ 610 can be mathematically denoted as following:

$$C(\omega) = \sum_n \sum_i \delta(\omega - nB_i),$$

where the index i relates to frequencies (tones) included in the correlation basis $\{B_i\}$ 610 and the index n relates to the frequency sections (octaves) in which the tones (j=1, . . . , $j_{max}$) are repeated such as depicted in FIG. 5a.

The modulation $C(\omega)$ 615 defining all frequencies employed for embedding characters/symbols in the audio signal s(t) allows to delete all audio signal information from the audio signal s(t) which does not related in any way to coded characters/symbols. The Fourier signal $Z(\omega)$ 605 is convoluted with the modulation $C(\omega)$ 615 resulting in a convolution signal $Y(\omega)$ representing frequency magnitude signals of the audio Fourier signal $Z(\omega)$ 605 at the frequencies being comprised in the modulation $C(\omega)$ 615 and correlation basis $\{B_i\}$ 610, respectively. The convolution may be operated by a convoluting component. The frequency magnitude signals of the audio Fourier signal $Z(\omega)$ 605 at frequencies being not comprised in the modulation $C(\omega)$ 615 and correlation basis $\{B_i\}$ 610, respectively, are at least approximately zero.

In a following operation the overall convolution signal $Y(\omega)$ is evaluated at the frequencies which are associated with a certain code basis. That means, the convolution signal $Y(\omega)$ is evaluated at the frequencies defined by the code basis $\{b_j(x)\}$ 625, at the frequencies defined by the code basis $\{b_j(y)\}$ 630 and so on. The evaluation results in magnitude values M(x,n) 635, M(y,n) 640, . . . each representing an evaluation value corresponding to the magnitudes of the frequencies which are assigned to the code basis $\{b_j(x)\}$, to the code basis $\{b_j(y)\}$, . . . .

The magnitude values M(x,n), M(y,n), . . . may be obtained by adding the frequency magnitudes at frequencies defined by the each code basis. The following expression defines mathematically a magnitude value for the example of the character/symbol x having the code basis $\{b_j(x)\}$:

$$M(x, n) = \sum_j Y(nb_j(x)),$$

where index j relates to frequencies (tones) included in the code basis $\{b_j(x)\}$. The calculation of the magnitude values M(x,n), M(y,n), . . . may be performed by one summarizing component or summarizer receiving the convolution signal $Y(\omega)$ and subsequently the frequencies of the code bases $b_j(x)$), $b_j(y)$), . . . to provide correspondingly the magnitude values M(x,n), M(y,n), . . . in sequence or may be performed by a plurality of summarizing components or summarizers each the convolution signal $Y(\omega)$ and one of the sets of frequencies corresponding to one of the code bases $b_j(x)$), $b_j(y)$), . . . to provide correspondingly the magnitude values M(x,n), M(y,n), . . . in parallel.

A final evaluation of the magnitude values M(x,n), M(y,n), . . . is obtained by comparing each f with another. The comparisons of each of the magnitude values M(x,n), M(y,n), . . . with each other may be defined as by a quotient of magnitude values of each character/symbol pair such as (x,y). The ratio R(x,y,n) 645 may be expressed mathematically as following:

$$R(x, y, n) = \frac{M(x, n)}{M(y, n)} = \frac{\sum_j Y(nb_j(x))}{\sum_j Y(nb_j(y))}$$

where index j relates to frequencies (tones) included in the code basis $\{b_j(x)\}$ and the code basis $\{b_j(y)\}$, respectively. In case of a number of L code bases $\{b_j(z_p)\}$, where p=1, L, the number of ratios R($z_p$,$z_q$,n), where p,q=1, L and p q, is totally equal to L*(L−1). Each ratio R(x,y,n) 645 may be calculated by a respective divider or dividing component or alternatively, each ratio R(x,y,n) 645 may be calculated and provided by one divider or dividing component subsequently.

In case of suitable or onthogonal code bases the ratio R($\chi$,x,n) corresponding to the unknown character/symbol $\chi$ is significantly greater as the ratios R(x,y,n) . . . which do not correspond to the unknown character/symbol $\chi$. Thus, the unknown character/symbol $\chi$ is extracted and determined from the audio signal s(t).

In general, the identification of the unknown character/symbol x by evaluation the ratios R(x,y,n), . . . , may be uncertain. In such a case a probability evaluation of the ratios R(x,y,n), may result in a more reliable and certain result. The evaluation of a kind of maximum probability can be employed therefor.

The frequencies of the code bases may be coded as frequencies having a certain length, in particular of constant time e.g. approximately 0.1 seconds, wherein the coding of frequencies belonging to different code bases are separated by a certain duration of time, in particular of a constant time such as approximately 0.05 seconds. The coding of constant-time frequency signals and constant-time separation makes it particularly easy to decode the signals. Further, the coded information may be completed by error correction information, check ode information, redundancy information such as known from signal processing technology to enhance the robustness of the coded information due to interference.

In the embodiment shown in FIG. 5d, a mean value <R>650 of all the ratios R(x,y,n) is derived. The mean value <R> allows to normalize the ratios R(x,y,n), . . . resulting in a corresponding set of normalized ratios F(x,y,n), The normalization of the ratios R(x,y,n), . . . takes into account that the frequency magnitudes evaluated incorporates magnitude contributions of the original audio signal so(t). The normalization maps (centers) the ratios R(x,y,n), . . . around 1 which makes the evaluation of the obtained ratios R(x,y,n) or normalized ratios F(x,y,n), . . . much more easier.

The mean value <R>650 may be obtained by a component for calculating a mean value from a plurality of individual values. Typically, the arithmetic mean, the geometric mean, the square mean are known mean values. Further different means, especially weighted or weighting means may be employed for normalizing.

In the following examples represent embodiments of the present invention which employ the aforementioned capability for embedding information directly into an audio sequence.

Example

Prepending/Appending Tags and/or Meta-Information to an Audio Sequence

The appending of context information to an audio sequence is preferable since this information is immediately also available with the audio sequence without requiring handling of additional information and without ensuring the availability of the additional information.

The method for embedding information of any type into an audio sequence according to an embodiment of the invention can be also employed to append information at the beginning of the audio sequence, in the following designated as prepending, and to append information at the end of the audio sequence, in the following designated as appending. In order to prepend and/or append information to an audio sequence an audio sequence coding silence is predended and/or appended to the original audio sequence. The respective audio sequence coding silence is used to embed information as described in combination with the aforementioned method for embedding information into an audio sequence which forms audio signals predended and/or appended to the audio sequence.

A following constructed audio sequence exhibits prepended and/appended information arranged to an original audio sequence. The constructed audio sequence may be established as following:

BEGIN_TAG tone
TAG tones for coding prepending information
END_TAG tone BEGIN_CLIP tone
audio sequence (with or without embedded information/tag)

-continued

END_CLIP tone
BEGIN_TAG tone
TAG tones for coding appending information
END_TAG tone
START METADATA tone
METADATA tones for coding meta-information
END_METADATA tone In detail, the prepending information is coded by an initial (BEGIN TAG) tone, which is a signal with a certain frequency or with certain multiple frequencies, one or more TAG tones for coding information, and a final (END_TAG) tone, which is again a signal with a certain frequency or with certain multiple frequencies. The initial one or more TAG tones shall enable to identify the audio sequence uniquely, therefore, the initial one or more TAG tones include for example time information about the recording of the audio sequence (for example UTC encoded), identification information about the terminal/device which has been used for recording (for example an IMEI code of a cellular terminal) and further identification information. But the combination of the above presented time and identification information provided for unique identification since one only one audio sequence (voice message/mail) can be recorded by one given terminal/device at one time.

The one or more TAG tones may be used to coded numbers for 0 to 9, which have a simple implementation as musical tones. The TAG for such a clip for example created on Jan. 15, 2002, at 9:45:17 UTC on terminal 357149/19/415292/7 can be coded as the following number sequence: 2•0•0•2 0 1•1 5•0•9•4•5•1•7•3•5•7•1•4•9•1•9•4•1•5•2•9•2•7.

Analogously, the appending information is again coded by an initial (BEGIN_TAG) tone, which is a signal with a certain frequency or with certain multiple frequencies, one or more TAG tones for coding information, and a final (END_TAG) tone, which is again a signal with a certain frequency or with certain multiple frequencies.

Moreover, the additional appending information is coded by an initial (START_METADATA) tone, which is a signal with a certain frequency or with certain multiple frequencies, one or more METADATA tones for coding meta-information, and a final (END_METADATA) tone, which is again a signal with a certain frequency or with certain multiple frequencies. The meta-information can be used to code information being associated with the original audio sequence, such as address information (link information, URL information and the like), but also content information which may be coded itself for example by using a markup language such as hypertext markup language (HTML), wireless markup language (WML), extended markup language (XML) and the like. The method for embedding information into an audio sequence allows to code information of any type by providing an arbitrary coding bases.

The tone system mentioned above can be used to create a basis for e.g. the ASCII table or a subset of it, plus a few additional tones shown above. According to an embodiment of the invention, the METADATA tones are implemented directly as code bases corresponding to ASCII character/symbol table. A code bases allowing to create a reliable 7- or 8-bit coding scheme in accordance with the aforementioned method is possible. An alternative coding scheme to coding the ASCII character/symbol table refers to the use of the three-digit representation for the ASCII character/symbols in question. For example the character "A" is represented by the number sequence 065. A part of the corresponding coding table associating to each symbol of the ASCII character/symbol table a unique three-digit number sequence is shown in the following table:

| +   | 000 | 001 | 002 | 003 | 004 | 005 | 006 | 007 | 008 | 009 |
|-----|-----|-----|-----|-----|-----|-----|-----|-----|-----|-----|
| 040 |     | (   | )   | *   | +   | ,   | -   | .   | /   | 0   | 1 |
| 050 | 2   | 3   | 4   | 5   | 6   | 7   | 8   | 9   | :   | ;   |
| 060 | <   | =   | >   | ?   | @   | A   | B   | C   | D   | E   |
| 070 | E   | G   | H   | I   | J   | K   | L   | M   | N   | O   |
| 080 | P   | Q   | R   | S   | T   | U   | V   | W   | X   | Y   |
| 090 | Z   | [   | \   | ^   | _   | `   |     |     |     |     | where each character/symbol of the table has associated a column number and a row number, where the respective column number and respective row number are summarized to determine the respective three-digit number sequence.

By using this ASCII coding, the ASCII representation for the html tag "<HEAD>" for example would be 060-072-069-065-068-062, giving the tones 0•6•0•0•7•2•0•6•9•0•6•5•0•6•8•0•6•2. This coding creates many redundant 0's, and some other coding scheme (for example omitting the lowercase letters from the ASCII table) would enable just two digits to be used. However, this requires standardization. The advantage of the pure ASCII table representation is that it is global and well-standardized.

Corresponding code bases according to an embodiment of the invention to encode the number 0 to 9 required for embedding a three-digit encoded ACSII character/symbol table into an audio sequence may have the following form each comprising two different music tones being based on the known description for representing music tones C, D, E, F, G, A and H:

| "0": | C |   |   |   |   |   |   |
|------|---|---|---|---|---|---|---|
| "0": | C | D |   |   |   |   |   |
| "1": | C |   |   | F |   |   |   |
| "2": |   | D |   |   |   | A |   |
| "3": |   | D |   | F |   |   |   |
| "4": |   |   | E | F |   |   |   |
| "5": |   |   | E |   |   |   | H |
| "6": |   |   |   | F |   |   | H |
| "7": | C |   |   |   | G |   |   |
| "8": |   |   |   |   | G | A |   |
| "9": |   |   | E |   |   |   | H |

The presented code bases represent advantageous code bases since all pairs of code bases have at most one tone in common, and the two tones for each code are mostly separated by at least two frequencies which decreases inter-frequency interference. With this choice, it is possible to make the codes nearly orthogonal (having a small correlation) and also separated enough from each other that small glitches in the original audio signal (playback/recording) are not strongly affected.

The advantageous of the code bases each comprising two music tones can be recognized by assuming that the number which is coded is the number "7" comprising the music tones "C" and "G". Further assuming this number is to be decoded from an audio sequence. The magnitude signal M(x,n) may be expressed mathematically by:

$$M(x, n) = \sum_i A(nb_i) * (1 + K\delta(i, a))$$

where index i relates to frequencies (tones) included in the code basis $\{b_i(x)\}$, $\delta(i,a)$ is equal to 1 in case i is one of the indices coding x, and otherwise 0, K the and $A(\omega)$ the contribution of the original audio signal into which the number "7" is embedded. The aforementioned mathematical expression can be divided into portion-wise defined expression:

$$M(x, n) = \begin{cases} \sum_i A(nb_i) + K[A(nb_C) + A(nb_G)] & \text{in case} \quad x = \text{``1''} \\ \sum_i A(nb_i) & \text{in case} \quad x = \text{``0''} \wedge t = \text{``C''} \\ \sum_i A(nb_i) + K[A(nb_i)] & \text{in case} \begin{cases} x = \text{``0''} \wedge t = \text{``C''}; \\ x = \text{``1''} \wedge t = \text{``C''}; \\ x = \text{``8''} \wedge t = \text{``G''} \end{cases} \end{cases}$$

or summarized:

$$M(x, n) = \sum_i A(nb_i) + K[\delta(x, \{7, 0, 1\})A(nb_C) + \delta(x, \{7, 8\})A(nb_G)]$$

As a very rough approximation, it could assumed that over long times, the various $A(nb_i)$ will be equal, designated as a time mean value $\langle A \rangle$, resulting to $$\frac{M(x, n)}{\langle A \rangle} \approx 7 + K[\delta(x, \{7, 0, 1\}) + \delta(x, \{7, 8\})]$$

Assume that the attenuation value K is pre-defined as a relative small value K=0.2, the magnitude (amplitude) of the signal equal to 7.4 in case that the symbol '7' is embedded whereas the magnitude (amplitude) value of the signal is equal to 7.0-7.2 in case one of the other symbols ('0' to '6', '8', '9') is embedded. The system must be capable of distinguishing magnitude (amplitude) values from roughly 5% signal differences.

Example

Meta-Information

In view of the organizing of user provided information with meta-information as described in detail with reference to the personal logbook, such meta-information may be embedded directly into such an audio information. The advantage of a direct embedding is that the meta-information is always present and retrievable without using any retrieval functionality as described in context of the personal logbook. The meta-information can be used to code information being associated with the original audio sequence, such as address information (link information, URL information and the like), but also content information which may be coded itself for example by using a markup language such as hypertext markup language (HTML), wireless markup language (WML), extended markup language (XML) and the like. The method for embedding information into an audio sequence allows to code information of any type by providing an arbitrary coding bases. The language encoding system and alphabet is given above allows to code any clear text information independent from its meaning and purpose. The alphabet described there can be used to embed the letters of any markup language around or within the audio clip itself; in particular, the markup codes could be embedded in the METADATA field described therein. These letters can then later be retrieved from the audio clip by the aforementioned method and converted to a machine-readable format of the markup language.

Example

Watermarking an Audio Sequence

Watermarking is a technique being used for example to code information about for example origin of electronic data and the producer of the electronic data in a manner which ensures that the information is present and decodable from the electronic data even in case the electronic data have been manipulated. Basically, watermarking was introduced to save copyright information of digitally provided images. Such a technique is also of interest for being provided for digital audio information.

The simplest watermark is just the aforementioned TAG information of the audio sequence. A constant-time tone with a fairly long time, e.g. several tenths of a second or more, may be employed, since it is then easier to identify the code statistically. More complex redundancy and error correction schemes may also be added if so desired.

Moreover, it is possible to insert the TAG information and meta-information directly into the audio sequence by embedding the information according to an embodiment of the invention. The embedded information replaces an app ending/prepending of the TAG information which may interfere the audio reproduction in systems which do not recognize the prep ending/appending information as information being coded.

Example

Authentication Watermark

The aforementioned method for embedding information of any type into an audio sequence can be used to embed a hidden authentication watermark into the audio sequence. The authentication watermark may be relevant in e.g. some legal situations, and allows to verify whether modifications of the audio sequences have been made. The authentication watermark relies on known digital signature algorithms.

In an embodiment of the invention, the aforementioned prepending information, i.e. the prepending TAG, can be used as a basis for authentication watermark. The prepending information is encrypted resulting in an encrypted ENCTAG, for example by employing a strong asymmetric encryption procedure, such as a public key encryption employing a public and a private (secret) key. The encrypted ENCTAG is embedded into the original audio sequence.

The authentication of the embedded encrypted ENCTAG can be verified by the receiver of the corresponding audio sequence, but only the sender (producer) is actual able to decrypt the embedded encrypted ENCTAG.

The aforementioned method for embedding an authentication watermark can be improved by implementing obtaining a kind of checksum from the original audio signal to create a signature which can not be manipulated or exchanged resulting in a more reliable authentication watermark. The audio Fourier transform $A(\omega)$ is partitioned into several discrete segments of for example a constant length such as a length of 0.1 seconds and the frequencies are discretized into a certain number of frequency sections such as 8 frequency sections. Discretized amplitude values $A'(\omega)$ are obtained from the audio Fourier transform $A(\omega)$ and an amplitude mean value $<A>$, i.e. an average amplitude, of the audio Fourier transform $A(\omega)$. In case the actual amplitude value of the audio Fourier transform $A(\omega)$ is less than the amplitude mean value $<A>$, the corresponding discretized amplitude value $A'(\omega)$ is set equal to zero, whereas in case the actual amplitude value of the audio Fourier transform $A(\omega)$ is greater than the amplitude mean value $<A>$, the corresponding discretized amplitude value $A'(\omega)$ is set equal to one.

The resulting discretized amplitude values $M(\omega))$ comprises a sequence consisting of "0" and "1" which can be interpreted as a bit sequence. Moreover, this sequence may be partitioned into parts of 8 discretized amplitude values which are interpreted to form a sequence of 8-bit values of the total time of the audio sequence. The sequence of 8-bit values can be is treated as aforementioned for embedding information into an audio sequence, in particular an ASCII coding employing 8 bits. Moreover, the sequence of 8-bit values may be encrypted using any known encryption method, such as an asymmetric encryption method like the public key encryption. The encrypted sequence is finally embedded into the audio sequence and allows a receiver of the audio sequence to separate the encrypted sequence from the audio sequence for verifying the authentication of the audio sequence.

The embedding of an encrypted information may be hidden. The hiding of information embedded in an audio sequence according to an embodiment of the invention can be achieved by employing code bases unique to the user and varying in time. Additionally, normal code bases may be employed to embed further information in a transparent (this information is apparent to a receiver reproducing the audio sequence) way to the audio sequence.

Referring to FIG. 5d relating to the extracting of embedded information, it is nearly impossible to calculate M(x,n) from an audio sequence having embedded information in case the frequencies of the code bases (the correlation basis) used originally for embedding the information are unknown. Depending on the coding density (duration of time of each signal of a code basis) a small value may be selected for the amplitude coefficient K, i.e. the attenuation K which results in an "invisible" and "inaudible" embedded information, respectively.

Example

FAT Coding

An improved implementation of an embodiment according to the invention allows to establish a file allocation table analogously to the file allocation table technique known from file handling and managing techniques in processing devices. Such a FAT comprises information about an identification sequence, an associated name, a length, a location on the memory medium or the storage device (such as a start time in serial media) and the like. The aforementioned capability of map ASCII coding into a frequency based audio coding allows to code that information correspondingly.

For robustness and security reasons, it may be recommended to re-write the audio FAT information embedded in an audio sequence each time the audio FAT information changes and the preserve the previous audio FAT information until the new audio FAT information coding is completed.

The retrieving of audio FAT information embedded in an audio sequence requires a complete processing of the audio sequence to extract that information therefrom. Corresponding to the available processing capability employed for retrieving the audio FAT information, the extracting process may be time-intensive such that a separate storing (mirroring) of the FAT information independently from the audio sequence is advantageous to preserve processing capabilities and processing time. A finalizing operation may ensure that the FAT information being (mirrored) provided separately and the FAT information being embedding in the audio sequence are identical. The finalizing operation may be operated as a synchronization operation, i.e. at a certain time interval or at certain event at which the synchronizing of the FAT information is useful to prevent any unsynchronized situations.

The audio FAT information may be stored at a fixed position in the audio sequence for example pre-defined by a pointer referring to a certain moment of time in the audio sequence. Moreover, the duration of time required for storing the audio FAT information may be allocated permanently and unambiguously for the audio FAT information.

It will be obvious for those skilled in the art that as the technology advances, the inventive concept can be implemented in a broad number of ways. The invention and its embodiments are thus not limited to the examples described above but may vary within the scope of the claims.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method utilizing at least a mobile terminal for organizing user provided information comprising:
   receiving the user provided information obtained in consequence to a user operation on the mobile terminal, the user provided information including first time information associated with the user operation;
   assigning a membership function to an identified calendar entry in an electronic calendar implemented at the mobile terminal, the identified calendar entry including second time information relating to an event time defined by the identified calendar entry, and the membership function being based on a comparison of the first time information and the second time information;
   deriving a membership grade value for the user provided information from the membership function in accordance with the first time information, the membership grade value estimating relevancy of the user provided information to the identified calendar entry;
   assigning meta-information obtained from context information of the identified calendar entry to the user provided information after the user provided information is estimated to be relevant to the identified calendar entry by the membership grade value;
   indexing the user provided information with the identified calendar entry; and
   causing storage of the user provided information and the meta-information in a history storage, thereby providing an information history functionality;
   wherein
      the meta-information and the indexing are employable for retrieval of the user provided information in the history storage, the meta-information being employable for retrieval of the user provided information by matching request information of a retrieval request with the meta-information for selecting the user provided information assigned to the meta-information matched to the request information, and
      the user provided information comprises at least a multimedia content operable with the mobile terminal.

2. The method according to claim 1, wherein receiving the user provided information comprises one or more of:
   receiving user input information being generated by user operation of any input of the mobile terminal; or
   receiving one or more of transaction information or communication information being received via any communication interface of the mobile terminal.

3. The method according to claim 1, wherein assigning the meta-information to the user provided information comprises:
   extracting one or more of labeling information or indexing information from the context information;
   assigning the extracted one or more of labeling information or indexing information to the user provided information; and
   causing storage of the assigned one or more of labeling information or indexing information and of the user provided information;
   wherein the one or more of the labeling information or indexing information comprises the meta-information employable for retrieval functionality of the user provided information.

4. The method according to claim 1, wherein associating the context information with the user provided information comprises:
   generating referencing information for at least a portion of the user provided information;
   causing storage of the referencing information in a first storage area; and
   causing storage of the at least a portion of the user provided information in a second storage area;
   wherein the referencing information comprises address information enabling retrieval of the at least a portion of the user provided information from the second storage area.

5. The method according to claim 1, wherein the second time information of the identified calendar entry comprises a start time and an end time, and wherein the membership function comprises a function in time rising from zero value at a predetermined moment in time before the start time and becomes zero value at a predefined moment in time after the end time, the membership function defining an extended timeframe for the identified calendar entry.

6. The method according to claim 1, further comprising:
   using the first and second time information to verify that the identified calendar entry matches the user provided information.

7. The method according to claim 1, wherein the identified calendar entry is formatted using a semantic structure comprising a plurality of fields, and wherein the context information is extracted from data stored in one or more of the plurality of fields of the identified calendar entry based at least in part on the semantic structure.

8. The method according to claim 1, wherein indexing the user provided information with the identified calendar entry comprises indexing the user provided information with the whole identified calendar entry.

9. The method according to claim 1, wherein the electronic calendar comprises a personal calendar for a user of the mobile terminal.

10. The method according to claim 1, wherein the membership function defines an extended timeframe for the identified calendar entry.

11. The method according to claim 1, wherein the second time information of the identified calendar entry comprises a start time and an end time, and wherein the membership function comprises a function of time ranging from before the start time to after the end time of the second time information.

12. An apparatus for organizing user provided information comprising at least one computer processor and at least one computer memory storing computer program code, wherein the at least one computer memory and stored computer program code are configured to, with the at least one computer processor, cause the apparatus to at least:
receive the user provided information obtained in consequence to a user operation on the apparatus, the user provided information including first time information associated with the user operation;
assign a membership function to an identified calendar entry in an electronic calendar implemented at the apparatus, the identified calendar entry including second time information relating to an event time defined by the identified calendar entry, and the membership function being based on a comparison of the first time information and the second time information;
derive a membership grade value for the user provided information from the membership function in accordance with the first time information, the membership grade value estimating relevancy of the user provided information to the identified calendar entry;
assign meta-information obtained from context information of the identified calendar entry to the user provided information after the user provided information is estimated to be relevant to the identified calendar entry by the membership grade value;
index the user provided information with the identified calendar entry; and
cause storage of the user provided information and the meta-information in a history storage, thereby providing an information history functionality;
wherein
the meta-information and the indexing are employable for retrieval of the user provided information in the history storage, the meta-information being employable for retrieval of the user provided information by matching request information of a retrieval request with the meta-information for selecting the user provided information assigned to the meta-information matched to the request information, and
the user provided information comprises at least a multimedia content operable with the mobile terminal.

13. The apparatus according to claim 12, wherein the at least one computer memory and stored computer program code are configured to, with the at least one computer processor, cause the apparatus to receive the user provided information at least in part by one or more of:

receiving user input information being generated by user operation of any input operatively coupled to the apparatus; or
receiving one or more of transaction information or communication information being received via any communication interface operatively coupled to the apparatus.

14. The apparatus according to claim 12, wherein the at least one computer memory and stored computer program code are configured to, with the at least one computer processor, cause the apparatus to assign the meta-information to the user provided information at least in part by:
extracting one or more of labeling information or indexing information from the context information;
assigning the extracted one or more of labeling information or indexing information to the user provided information; and
causing storage of the assigned one or more of labeling information or indexing information and of the user provided information;
wherein the one or more of the labeling information or indexing information comprises the meta-information employable for retrieval functionality of the user provided information.

15. The apparatus according to claim 12, wherein the at least one computer memory and stored computer program code are configured to, with the at least one computer processor, cause the apparatus to associate the context information with the user provided information at least in part by:
generating referencing information for at least a portion of the user provided information;
causing storage of the referencing information in a first storage area; and
causing storage of the at least a portion of the user provided information in a second storage area;
wherein the referencing information comprises address information enabling retrieval of the at least a portion of the user provided information from the second storage area.

16. The apparatus according to claim 12, wherein the second time information of the identified calendar entry comprises a start time and an end time, and wherein the membership function comprises a function in time rising from zero value at a predetermined moment in time before the start time and becomes zero value at a predefined moment in time after the end time, the membership function defining an extended timeframe for the identified calendar entry.

17. The apparatus according to claim 12, wherein the at least one computer memory and stored computer program code are configured to, with the at least one computer processor, further cause the apparatus to:
use the first and second time information to verify that the identified calendar entry matches the user provided information.

18. The apparatus according to claim 12, wherein the apparatus comprises or is embodied on a mobile terminal.

19. A computer program product comprising at least one non-transitory computer readable storage medium storing computer program code for organizing user provided information, the computer program code comprising:
program code instructions configured to receive the user provided information obtained in consequence to a user operation on a mobile terminal, the user provided information including first time information associated with the user operation;

program code instructions configured to assign a membership function to an identified calendar entry in an electronic calendar implemented at the mobile terminal, the identified calendar entry including second time information relating to an event time defined by the identified calendar entry, and the membership function being based on a comparison of the first time information and the second time information;

program code instructions configured to derive a membership grade value for the user provided information from the membership function in accordance with the first time information, the membership grade value estimating relevancy of the user provided information to the identified calendar entry;

program code instructions configured to assign meta-information obtained from context information of the identified calendar entry to the user provided information after the user provided information is estimated to be relevant to the identified calendar entry by the membership grade value;

program code instructions configured to index the user provided information with the identified calendar entry; and program code instructions configured to cause storage of the user provided information and the meta-information in a history storage, thereby providing an information history functionality;

wherein the meta-information and the indexing are employable for retrieval of the user provided information in the history storage, the meta-information being employable for retrieval of the user provided information by matching request information of a retrieval request with the meta-information for selecting the user provided information assigned to the meta-information matched to the request information, and the user provided information comprises at least a multimedia content operable with the mobile terminal.

* * * * *